(12) United States Patent
Espinosa

(10) Patent No.: US 12,525,114 B2
(45) Date of Patent: Jan. 13, 2026

(54) GATEKEEPING SYSTEM AND METHODS TO DETECT AND ALERT ERRORS DURING PARTS RECEIVING

(71) Applicant: TOYOTA MOTOR NORTH AMERICA, INC., Plano, TX (US)

(72) Inventor: Enrique David Espinosa, Kitchener (CA)

(73) Assignees: TOYOTA MOTOR NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 155 days.

(21) Appl. No.: 18/457,160

(22) Filed: Aug. 28, 2023

(65) Prior Publication Data

US 2025/0078642 A1    Mar. 6, 2025

(51) Int. Cl.
*G08B 21/12*    (2006.01)
*G06K 19/06*    (2006.01)
(Continued)

(52) U.S. Cl.
CPC ..... *G08B 21/182* (2013.01); *G06K 19/06028* (2013.01); *G06Q 10/087* (2013.01); *G06V 20/52* (2022.01)

(58) Field of Classification Search
CPC ........ G06F 21/32; G06F 16/532; G06F 40/40; G06F 11/08; G06F 11/1048;
(Continued)

(56) References Cited

U.S. PATENT DOCUMENTS

| 5,604,715 A | * | 2/1997 | Aman | ............... B66F 9/0755 367/128 |
| 7,596,516 B2 | | 9/2009 | Starkowsky | |

(Continued)

FOREIGN PATENT DOCUMENTS

| CA | 3045657 A1 | 6/2018 |
| WO | 2012068353 A2 | 5/2012 |

(Continued)

OTHER PUBLICATIONS

Cyril Alias, Cagdas Ozgur, Bernd Noche, Monitoring Production and Logistics Processes with the Help of Industrial Image Processing, 10 pages, May 2016.

(Continued)

*Primary Examiner* — Daniel Previl
(74) *Attorney, Agent, or Firm* — HAYNES AND BOONE, LLP

(57) ABSTRACT

A computer-implemented method for identifying parts and determining errors in parts receiving at a parts receiving area and includes determining an output using a first sensor. The output is associated with at least one parts container. The computer-implemented method includes comparing the output to a stored expected output; and determining that the comparison exceeds a threshold. The comparison exceeding the threshold indicates an error with parts receiving. The computer-implemented method includes determining a cause of the error, using a second sensor, in response to determining that the comparison exceeded the threshold; and outputting, to a display, a notification about the cause of the error.

20 Claims, 13 Drawing Sheets

(51) Int. Cl.
*G06Q 10/087* (2023.01)
*G06V 20/52* (2022.01)
*G08B 21/18* (2006.01)

(58) Field of Classification Search
CPC ...... G06F 11/1076; G06F 18/22; G06F 3/014;
G06F 3/016; G06F 3/017; G06F 3/0482;
G06F 3/04883; G06F 40/106; G06V
40/166; G06V 40/171; G06V 40/172;
G06V 40/176; G06V 20/50; G06V 40/40;
G06V 40/70; G06V 10/145; G06V 10/60;
G06V 40/45; G06V 10/82; G06V 40/16;
G06V 40/174; G06V 10/40; G06V 10/56;
G06V 40/1382; G06V 10/75; G06V
20/52; G06V 30/10; G06V 30/412; G06V
30/414; G06V 30/418; G10L 13/02;
G10L 15/08; G10L 15/25; G10L 15/20;
G10L 15/22; G10L 2015/088; G10L
2015/223; G10L 13/00; G10L 13/027;
G10L 15/16; G10L 17/02; G10L 17/04;
G10L 17/10; G10L 17/18; G10L 25/84;
G10L 15/183; G10L 15/26; G10L 25/60;
G10L 15/01; G10L 15/32; A61B 5/0064;
A61B 5/117; A61B 5/1176; A61B 5/165;
A61B 5/6803; A61B 2560/0223; A61B
2562/0238; A61B 2562/0247; A61B
2562/0271; A61B 2576/00; A61B 5/0004;
A61B 5/0013; A61B 5/0075; A61B
5/0077; A61B 5/02108; A61B 5/02141;
A61B 5/02255; A61B 5/02416; A61B
5/0261; A61B 5/1032; A61B 5/14551;
A61B 5/6826; A61B 5/6898; A61B
5/7221; A61B 5/7225; A61B 5/7264;
A61B 5/742; A61B 5/743; H04R 1/028;
H04R 1/10; G06Q 20/40145; G06Q
10/0631; G06Q 10/08; G06Q 10/0833;
G06Q 10/087; H04L 63/0861; H04L
63/108; H04L 51/10; H04L 51/212; G06T
7/90; H04M 1/2475; H04M 1/72433;
H04M 1/72478; H04M 2201/40; H04M
2201/60; H04M 3/42391; H04M 1/72436;
G11C 11/5621; G11C 11/5642; G11C
11/5671; G11C 13/0033; G11C 13/0035;
G11C 16/3431; G11C 16/349; G11C
29/028; G11C 7/1006; H03M 13/1111;
H03M 13/1515; H03M 13/152; H03M
13/3738; H03M 13/41; H03M 13/4138;
G06K 19/0723; G06K 7/10297; G06K
19/06028; B60W 2050/0031; B60W
2556/20; B60W 2556/45; B60W 30/09;
B60W 30/0956; B60W 50/0097; B60W
50/0205; B60W 60/0011; B60W
60/00274; G06N 3/02; G06N 3/045;
G06N 3/08; G08B 21/182
USPC .... 340/540, 539.32, 544, 547, 545.3, 568.1,
340/568.4, 571, 572.1, 588, 636.11, 685,
340/691.6, 3.43, 825.23
See application file for complete search history.

(56) References Cited

U.S. PATENT DOCUMENTS

| | | | |
|---|---|---|---|
| 7,725,366 | B1 | 5/2010 | Franco |
| 7,752,089 | B2 | 7/2010 | Sarangapani |
| 7,969,306 | B2 | 6/2011 | Ebert |
| 9,965,737 | B2 | 5/2018 | Herndon |
| 10,181,106 | B2 | 1/2019 | Borodow |
| 10,304,029 | B2 | 5/2019 | Skaaksrud |
| 10,672,271 | B2 | 6/2020 | O'Sullivan |
| 11,030,576 | B2 | 6/2021 | Barto |
| 11,100,300 | B2 | 8/2021 | Plummer |
| 11,151,506 | B2 | 10/2021 | Kilburn |
| 11,526,840 | B2 * | 12/2022 | Kumar ............... G07G 1/0036 |
| 2007/0282482 | A1 | 12/2007 | Beucher |
| 2017/0068928 | A1 | 3/2017 | Barto |
| 2017/0098190 | A1 | 4/2017 | Moskos |
| 2018/0240322 | A1 * | 8/2018 | Potucek .................. E04H 4/14 |
| 2019/0080072 | A1 * | 3/2019 | Van Os ................. G06F 3/016 |
| 2019/0372874 | A1 * | 12/2019 | Sanders ................ H04L 1/203 |
| 2021/0259789 | A1 * | 8/2021 | Wright .................. A61B 34/35 |
| 2021/0374659 | A1 * | 12/2021 | Ganapathi ........... B65G 1/1371 |

FOREIGN PATENT DOCUMENTS

| | | | |
|---|---|---|---|
| WO | 2021194413 | A1 | 9/2021 |
| WO | 2021216830 | A1 | 10/2021 |
| WO | 2021242957 | A1 | 12/2021 |

OTHER PUBLICATIONS

Oracle Netsuite, A Guide to Reverse Logistics: How it Works, Types and Strategies, Jan. 13, 2021, [Retrieved from the Internet <URL: https://www.netsuite.com/portal/resource/articles/inventory-management/reverselogistics.shtml.>.

Veridian, Why Reverse Logistics are Crucial to Customer Experiences, Mar. 11, 2019, Retrieved from the Internet <URL: https://veridian.info/reverse-logistics/.>.

Best Inc., Which Component of Reverse Logistics Would be Suiteable for Your Company?, Nov. 30, 2020, Retrieved from the Internet: <URL: https://web.archive.org/web/20210729184815/https://www.best-inc.us/which-component-of-reverse-logistics-would-be-suitable-for-your-company/>.

Qualitas Technologies, Automated Parts Counting—Industrial Automation, [retrieved on Aug. 28, 2023]. Retrieved from the Internet: <URL: https://qualitastech.com/parts-counting/>.

AWS Deepslens, The world's first deep learning enabled video camera for developers [retrieved on Aug. 28, 2023]. Retrieved from the Internet: <URL: https://aws.amazon.com/deeplens/>.

Warehouse Anywhere, Reverse Logistics, Dec. 7, 2022. Retrieved from the Internet: <URL: https://www.warehouseanywhere.com/resources/45-things-about-reverse-logistics/>.

Cognex, Intelligent Automation for a Smarter Tomorrow [retrieved on Aug. 28, 2023]. Retrieved from Internet: <URL:https://www.cognex.com/en-ca>.

Cogniac, Real Business Outcomes through Imagery [retrieved on Aug. 28, 2023]. Retrieved from Internet: <URL: https://cogniac.ai/>.

ABTO Software, Camera-Based Object Counting for Conveyors and Production Lines: Bottle Counting by Computer Vision [retrieved on Aug. 28, 2023]. Retrieved from the Internet: <URL:https://www.youtube.com/watch? v=VmnUKyRjOfw>.

* cited by examiner

GATEKEEPING SYSTEM AND METHODS TO DETECT AND ALERT ERRORS DURING PARTS RECEIVING

TECHNICAL FIELD

The present disclosure generally relates to reverse logistics and, more particularly, to a gatekeeping system to detect and alert errors during parts receiving, tracking parts received, weld cycle operations, and quality assurance.

BACKGROUND

Reverse logistics refers to processing an object or part "backward" through a supply chain, rather than processing a part to ultimately be delivered to an end-consumer. Gatekeeping is a sub-component of reverse logistics and refers to the monitoring and decision making involved in screening and limiting the number of materials that are permitted into the backward or reverse flow of the supply chain. If more materials are permitted into the reverse flow of the supply chain, then more time and money is lost by the manufacturers. Reverse logistics can include defective parts being sent back to the supplier, returns by customers, parts going missing, and the like.

Therefore, reducing the number of materials permitted into the reverse flow is desired. However, conventional systems only signal that a part is missing. The conventional systems fail to explain why the part is missing. Therefore, conventional systems only signal that there is an error, but fail to provide information on how the error occurred.

A system is needed to identify what caused the error in order to reduce the number of materials permitted into the reverse flow of the supply chain and to provide a report on what caused the error to a user.

SUMMARY

In one example embodiment, a computer-implemented method for identifying parts and determining errors in parts receiving at a parts receiving area, the computer-implemented method includes: determining an output using a first sensor, wherein the output is associated with at least one parts container; comparing the output to a stored expected output; determining that the comparison exceeds a threshold, wherein the comparison exceeding the threshold indicates an error with parts receiving; determining a cause of the error, using a second sensor, in response to determining that the comparison exceeded the threshold; and outputting, to a display, a notification about the cause of the error.

In another example embodiment, a method includes determining an output using a non-vision sensor at a parts receiving area, wherein the output is associated with a plurality of parts; comparing the output to a stored expected output; determining that the comparison exceeds a threshold, wherein the comparison exceeding the threshold indicates an error with parts receiving; determining a cause of the error, using a vision sensor, in response to determining that the comparison exceeded the threshold; identifying a pattern related to the cause of the error; and outputting, to a display, a notification about the pattern.

In one example embodiment, a system includes a plurality of sensors disposed throughout a parts receiving area, wherein the plurality of sensors comprise at least two of the following: a camera, a thermal camera, light detection and ranging ("LIDAR") sensor, barcode scanner, or weight sensor; and a non-transitory computer readable medium having stored thereon a plurality of instructions, wherein the instructions are executed with one or more processors so that the following steps are executed: determining an output using a first sensor of the plurality of sensors at a first portion of the parts receiving area, wherein the output is associated with a plurality of parts; comparing the output to a stored expected output, wherein the stored expected output is associated with the first portion of the parts receiving area; determining that the comparison exceeds a threshold, wherein the comparison exceeding the threshold indicates at least one missing part of the plurality of parts such that an error exists with parts receiving; determining, using a second sensor of the plurality of sensors at a second portion of the parts receiving area, a cause of the missing parts, in response to determining that the comparison exceeded the threshold, wherein the second portion of the parts receiving area is different from the first portion of the parts receiving area; and outputting, to a display, a notification about the cause of the at least one missing part of the plurality of parts.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals, letters, or both in the various examples. This repetition is for the purpose of simplicity and clarity and does not in itself dictate a relationship between the various embodiments and/or configurations discussed.

DETAILED DESCRIPTION

Illustrative embodiments and related methods of the present disclosure are described below as they might be employed in one or more methods and systems for identifying an error related to a part received and determining a cause for the error. In the interest of clarity, not all features of an actual implementation or method are described in this specification. It will of course be appreciated that in the development of any such actual embodiment, numerous implementation specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. Further aspects and advantages of the various embodiments and related methods of the disclosure will become apparent from consideration of the following description and drawings.

The example embodiments described below recognize that it may be desirable to have methods and systems that more efficiently identify errors related to parts receiving such as missing or defective parts. In particular, the embodiments described below provide methods and systems for combining a plurality of sensors and cameras to identify errors such as missing parts in a parts receiving area. Therefore, the methods and systems provide an improvement to error (e.g., missing part) identification.

One or more embodiments described below provide methods and systems for determining a reason why an error occurred. For example, in some embodiments, once a part has been identified as missing, these methods and systems execute automatically determining where the missing part is located and at what stage of the supply chain that the part went missing.

One or more illustrative embodiments described below provide methods and systems identify pattern changes and anomalies in inventory management to determine a pattern related to a set of missing parts. For example, a Docking Area Traceability Gatekeeper (DATG) may be used to identify missing parts, determine where the part went missing, determine why the part went missing, and/or develop a pattern for a set of missing parts. The DATG, in some embodiments, automatically establish inventory fault to supplier patterns. By establishing inventory fault, the break in the supply chain may be fixed, which in turn will reduce the number of hot calls on the floor of the dock and manufacturing plant and avoid expedited shipments to replace the missing parts.

Figure 1:
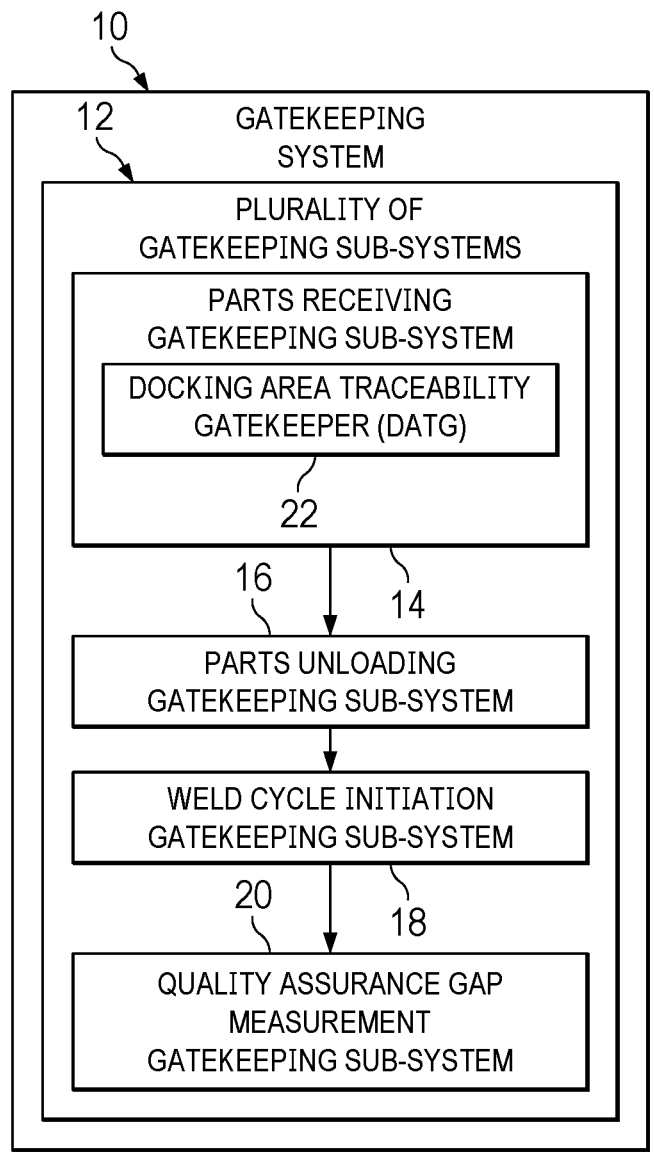
FIG. 1 is a block diagram depicting a gatekeeping system including a parts receiving gatekeeping sub-system in accordance with one or more embodiments.

Referring to FIG. 1, in an embodiment, a gatekeeping system is generally referred to by reference numeral 10. In one example embodiment, the gatekeeping system 10 includes a plurality of gatekeeping sub-systems 12. The plurality of gatekeeping sub-systems 12 include a parts receiving gatekeeping sub-system 14, a parts unloading gatekeeping sub-system 16, a weld cycle initiation gatekeeping sub-system 18, and a quality assurance gap measurement gatekeeping sub-system 20. The parts receiving gatekeeping sub-system 14 includes a docking area traceability gatekeeper (DATG) 22.

In one or more embodiments, the gatekeeping system 10 only includes the parts receiving gatekeeping sub-system 14 and the DATG 22. In some embodiments, the DATG 22 includes one or more of the other sub-systems: parts unloading gatekeeping sub-system 16, weld-cycle initiation gatekeeping sub-system 18, and quality assurance gap measurement sub-system 20. In other embodiments, the DATG 22 forms a portion of a separate sub-system: the parts receiving gatekeeping sub-system 14.

In several embodiments, one or more sub-systems of the plurality of gatekeeping sub-systems 12 communicate and/or are operably coupled with one or more other sub-systems of the plurality of gatekeeping sub-systems 12. In one or more embodiments, the parts receiving gatekeeping sub-system 14 communicates with the parts unloading gatekeeping sub-system 16. In several embodiments, the parts unloading gatekeeping sub-system 16 communicates with the weld cycle initiation gatekeeping sub-system 18. In one or more embodiments, the weld cycle initiation gatekeeping sub-system 18 communicates with the quality assurance gap measurement sub-system 20. In some embodiments, the plurality of gatekeeping sub-systems 12 includes additional sub-systems.

In operation, according to one or more embodiments, the gatekeeping system 10 operates to monitor and provide decision making by screening and limiting a number of materials that are permitted into a reverse flow of a supply chain. The gatekeeping system 10 includes the plurality of gatekeeping sub-systems 12 which are networked together and may work in concert to reduce the number of materials permitted into the reverse flow of the supply chain. For example, the DATG 22 of the parts receiving gatekeeping sub-system 14 may identify state of parts or freight arriving at and departing from the parts receiving area and may detect internal logistics, non-standard conditions such as, but not limited to, live freight incidents, dock gate operation gaps, and the like. The DATG 22, in some embodiments, may send an alert regarding live freight incidents such as when a part is missing, left-over, unused, faulty, and/or mishandled. Additionally, the DATG 22 may recognize a pattern of a set of missing or mishandled parts and send an alert reporting the pattern. The DATG 22 may provide to a user a reason, using the pattern, why the set of parts went missing or were mishandled via a display. The parts unloading gatekeeping sub-system 16 may similarly identify state of parts that are unloaded by a worker at a manufacturing area. The weld cycle initiation gatekeeping sub-system 18 may identify faulty or missing parts during the weld cycle (when individual components are assembled and welded together and then tested). The quality assurance gap measurement gatekeeping sub-system 20 may identify faulty or mishandled parts by determining a measurement of the part and/or a measurement of the part in relation to another feature (e.g., a gap between the part and the feature). The determined measurement may be compared to a threshold range. If the determined measure is outside the threshold range, the quality assurance gap measurement gatekeeping sub-system 20 may identify the part as faulty or mishandled. In some instances, the quality assurance gap measurement gatekeeping sub-system 20 may determine that the part was mishandled.

In some embodiments, the state of the parts of one sub-system is compared to the state of parts in another-subsystem of the plurality of gatekeeping sub-systems 12. For example, a state of the parts identified in parts receiving gatekeeping sub-system 14 may be compared to a state of the parts identified in parts unloading gatekeeping sub-system 16, and if the states differ, an alert is sent to a user.

In one or more embodiments, the parts receiving gatekeeping sub-system 14 tracks parts receiving and errors related to parts receiving such as but not limited to: missing parts, missing packages, empty racks, empty pallets, missing labels, empty pallets or packages getting returned to dock, parts or packages that fell off a rack at a parts receiving area, parts left in package, additional parts found, parts missing on a dolly, parts missing on a forklift, forklift location in the parts receiving area, vehicle location, additional or missing parts at a dock, additional or missing parts on a vehicle, additional or missing parts in a staging area, a part skipped, and the like. In some embodiments, the parts receiving gatekeeping sub-system 14 receives an invoice as an input. The invoice may include a set of invoices that become a schedule for that dock and may include route information for that part (for example, placing half of the freight in a first vehicle to be taken to a first area and placing the other half of the freight in a second vehicle to be taken to a second area). In one or more embodiments, the parts receiving gatekeeping sub-system 14 tracks parts using invoices and/or status of unloading freight from vehicle to determine how many parts are received versus how many parts were scheduled to be received. In various embodiments, the parts receiving gatekeeping sub-system 14 checks parts against the inventory to determine how many parts are left. In one or more embodiments, the parts receiving gatekeeping sub-system 14 tracks the route or "stage" of the part to determine where the part should be located at the parts receiving area and where the part is scheduled to go next.

In various embodiments, the parts unloading gatekeeping sub-system 16 includes a parts unloading traceability gatekeeper. In one or more embodiments, the weld cycle initiation gatekeeping sub-system 18 includes a robot cycle traceability gatekeeper. In several embodiments, the quality assurance gap measurement sub-system 20 includes a quality assurance traceability gatekeeper.

Figure 2:
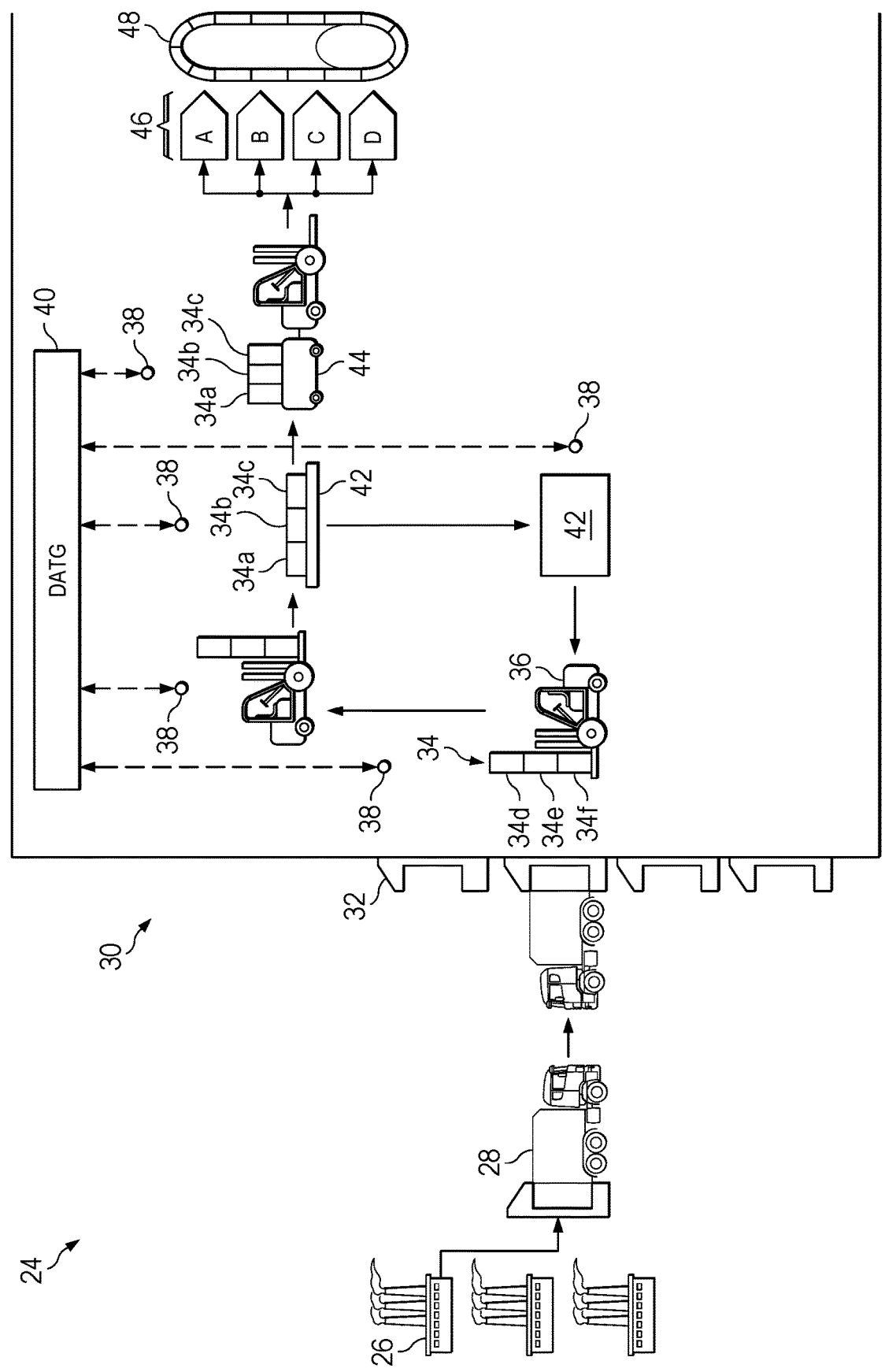
FIG. 2 is a diagrammatic illustration of a parts receiving gatekeeping sub-system and includes a Docking Area Traceability Gatekeeper (DATG) in accordance with one or more embodiments.

With reference to FIG. 2 and continuing reference to FIG. 1, a parts receiving gatekeeping sub-system is generally referred to by reference numeral 24. The parts receiving gatekeeping sub-system 24 includes suppliers 26, freight 28, and parts receiving area 30. The parts receiving area 30 includes one or more docks 32, a plurality of parts 34, a forklift 36, a plurality of sensors 38, docking area traceability gatekeeper 40, a pallet 42, a vehicle 44, a plurality of terminals 46, and a manufacturing area 48. The plurality of parts 34 may include a first part 34a, a second part 34b, a third part 34c, a fourth part 34d, a fifth part 34e, and a sixth part 34f.

In some embodiments, suppliers 26 may include a single supplier. In one or more embodiments, suppliers 26 are a plurality of suppliers at a plurality of locations.

In some embodiments, the freight 28 includes one or pallets of boxes, one or more packages, one or more parts, and the like. In several embodiments, freight 28 includes one or more empty pallets such as pallet 42, sent from the dock 32 back to the suppliers 26.

In one or more embodiments, the parts receiving area 30 is only a warehouse for parts receiving. In one or more embodiments, the parts receiving area 30 includes a warehouse and a portion of the manufacturing area. In some embodiments, the parts receiving area 30 is a plurality of warehouses. In various embodiments, the parts receiving area 30 includes a docking area, weld cycle area, and/or quality assurance area. In several embodiments, the docks 32 are aligned along a wall of the parts receiving area 30. In one or more embodiments, the docks 32 are for the freight 28 to be delivered via semi-trucks.

In one or more embodiments, the plurality of parts 34 may be any number of parts. In some embodiments, the plurality of parts 34 is a plurality of boxes of parts. In other embodiments, the plurality of parts 34 is a plurality of pallets (which include one or boxes) of parts. In one or more embodiments, the plurality of parts 34 are the same part. In other embodiments, the plurality of parts 34 vary by type. In some embodiments, the plurality of parts 34 are parts for a vehicle such as an electric vehicle or motor vehicle. In some embodiments, a varying number of parts of the plurality of parts 34 are unloaded from the freight 28. In several embodiments, the plurality of parts 34 are removed from a vehicle carrying the freight 28 by hand. In other embodiments, the plurality of parts 34 are removed by a machine such as the forklift 36 or a robot.

In some embodiments, the first part 34a, the second part 34b, and the third part 34c are individual parts. In other embodiments, the first part 34a, the second part 34b, and the third part 34c are individual boxes. In yet other embodiments, the first part 34a, the second part 34b, and the third part 34c are individual pallets. In some embodiments, fewer parts of the plurality of parts 34 are unloaded at a time. In other embodiments, more parts of the plurality of parts 34 (such as the fourth part 34d, the fifth part 34c, and the sixth part 34f) are unloaded at one time. In some embodiments, the fourth part 34d, the fifth part 34e, and the sixth part 34f are individual parts. In other embodiments, the fourth part 34d, the fifth part 34e, and the sixth part 34f are individual boxes. In yet other embodiments, the fourth part 34d, the fifth part 34e, and the sixth part 34f are individual pallets.

In some embodiments, the forklift 36 is replaced with another device to remove the plurality of parts 34 such as a dolly. In other embodiments, the plurality of parts 34 are removed by hand.

In several embodiments, the sensors 38 may be vision sensors including one or more of: thermal camera, a photographic camera, a videographic camera, a LIDAR ("Light Detection And Ranging") sensor and the like. In various embodiments, the sensors 38 may be non-vision sensors including, but not limited to, a weight sensor, or a barcode scanner. In one or more embodiments, at least one sensor 38 is located at the dock 32 to monitor the unloading of the freight 28. In some embodiments, sensors 38 are located in various locations around the parts receiving area 30. In several embodiments, the sensors 38 are located and coupled to a ceiling of the parts receiving area 30. In one or more embodiments, the sensors 38 are disposed within a floor of the parts receiving area 30. In some embodiments, at least a portion of sensors 38 are permanently affixed to a location in the parts receiving area 30. In one or more embodiments, at least a portion of the sensors 38 are not permanently affixed to a wall, ceiling, or floor of the parts receiving area 30 and may move (or be moved) about the parts receiving area 30. In some embodiments, the sensors 38 are disposed at specific intervals along a length of a parts receiving area 30. In one or more embodiments, the sensors 38 are disposed at specific sections of the parts receiving area 30 such as the dock 32, the terminals 46, and/or the manufacturing area 48.

In some embodiments, the DATG 40 includes a controller, computer, or a series of computers. In some embodiments, the DATG 40 includes one or more processors for running in the form of executable code stored on non-transitory, tangible, machine-readable media that may cause the one or more processors to perform one or more of the processes, as described herein. In several embodiments, the DATG 40 is in communication with and/or operably coupled to the sensors 38. In some embodiments, the DATG 40 is in communication with the sensors 38 via wireless or wired means.

In some embodiments, the pallet 42 is omitted. In some embodiments, a plurality of pallets are used to transport the plurality of parts 34.

In several embodiments, the vehicle 44 is a forklift such as forklift 36. In some embodiments, the vehicle 44 includes one or more trailers, wagons, or the like attached to the vehicle 44. In one or more embodiments, the trailers attached to the vehicle 44 may carry the plurality of parts 34 such as the first part 34a, the second part 34b, and the third part 34c. In some embodiments, the vehicle 44 is a dolly train.

In one or more embodiments, only one terminal of the plurality of terminals 46 leads to the manufacturing area 48. In some embodiments, the plurality of terminals 46 is a path from one portion of the parts receiving area 30 to another portion of the parts receiving area. In some embodiments, the plurality of terminals 46 connect a warehouse to a manufacturing area 48. In other embodiments, the plurality of terminals 46 lead to another parts receiving area for further shipment.

In some embodiments, the manufacturing area 48 is a separate area or building from the parts receiving area 30. In several embodiments, each terminal of the plurality of terminals 46 leads to a distinct and separate manufacturing area 48. In other embodiments, each terminal of the plurality of terminals 46 leads to a distinct and separate portion of a single manufacturing area 48.

In operation, the freight 28 is placed in a vehicle at the suppliers 26. Then, the freight 28 is shipped from the suppliers 26 to the dock 32. At the dock 32, a portion of the plurality of parts 34 is first unloaded from the vehicle. For example, the first part 34a, the second part 34b, and the third part 34c on a pallet 42 may be placed the forklift 36 and moved from the dock 32 inside the parts receiving area 30. The first part 34a, the second part 34b, and the third part 34c may then be transported and moved in the parts receiving area 30. The forklift 36 may drop the pallet 42 at a location within the parts receiving area 30. The first part 34a, the second part 34b, and the third part 34c may then be placed on the vehicle 44 for transport to a terminal of the plurality of terminals 46 and ultimately to be sent to the manufacturing area 48. The now-empty pallet 42 may be sent back to the dock 32 and/or vehicle carrying freight 28. More parts such as the fourth part 34d, the fifth part 34e, and the sixth part 34f may now be unloaded and the process repeated. During the parts receiving process, sensors 38 are placed throughout the parts receiving area 30 to monitor the plurality of parts 34. The sensors 38 communicate with the DATG 40 outputs of the sensor such as pictures, videos, measurements, and the like.

In some embodiments, the first part 34a, the second part 34b, and the third part 34c are stacked on top of one another and unloaded from the freight 28 of the vehicle. In other embodiments, a different number of plurality of parts 34 are unloaded. In some embodiments, the first part 34a, the second part 34b, and the third part 34c are each individual boxes of one or more parts. In several embodiments, the first part 34a, the second part 34b, and the third part 34c are positioned on a pallet 42. In one or more embodiments, the first part 34a, the second part 34b, and the third part 34c are removed from the pallet 42 and each are placed on a trailer of the vehicle 44. In some embodiments, the first part 34a, the second part 34b, and the third part 34c are delivered to one or more of the plurality of terminals 46. In some embodiments, a portion of the plurality of parts are delivered to one terminal of the plurality of terminals 46, while another portion of the plurality of parts 34 is delivered to another terminal of the plurality of terminals 46 via the vehicle 44. In some embodiments, the plurality of parts 34 are then taken to their respective location in the manufacturing area 48. In some embodiments, after the first part 34a, the second part 34b, and the third part 34c are unloaded from a vehicle carrying the freight 28, the fourth part 34d, the fifth part 34e, and the sixth part 34f are unloaded.

In one or more embodiments, the sensors 38 communicate sensor data to the DATG 40. The DATG 40, in some embodiments, determines an error in parts receiving such as, but not limited to: missing parts, defective parts (like broken, scratched, or mishandled parts), improper consumption of parts such as having two open packages of the same part, rather than finishing one package before opening another package, fallen packages, missing container for return, and the like.

In some embodiments, the pallet 42 is sent back as empty to the dock 32. In some embodiments, the pallet 42 is sent back as empty to the suppliers 26. In various embodiments, the pallet 42 is monitored and counted. In some embodiments, the pallets 42 or empty containers for return to the supplier are tracked.

FIG. 2 may illustrate, for example, the parts receiving gatekeeping sub-system 14 and DATG 22 of the gatekeeping system 10 of FIG. 1. The illustration of the parts receiving gatekeeping sub-system 24 in FIG. 2 is not meant to imply physical or architectural limitations to the manner in which an example embodiment may be implemented. Other components in addition to or in place of the ones illustrated may be used. Some components may be optional. Also, some blocks are presented to illustrate functional components. One or more of the blocks in FIG. 2 may be combined, divided, or combined and divided into different blocks when implemented in an example embodiment With reference to FIG. 3 and continuing reference to FIGS. 1 and 2, a docking area traceability gatekeeper (DATG) 50 is generally referred to by reference numeral 50. The DATG 50 includes input 52, sensors 54, output 56, inventory and parts identifier 58, error detection module 60, learning module 62, database 64, network 66, and one or more computing devices 68. The sensors 54 may include one or more cameras 70, one or more LIDAR sensors 72, one or more barcode scanners 74, and one or more weight sensors 76. The output 56 may include invoices 78, weight of freight 80, number of parts 82, number of empty packages 84, number of packages 86. The inventory parts identifier 58 may be operably coupled to and/or in communication with the error detection module 60. The error detection module 60 may be operably coupled to and/or in communication with the inventory and parts identifier 58, the learning module 62, and/or the database 64. The learning module 62 may be in communication with the database 64.

In some embodiments, the DATG 50 is a networked system that may include any number or combination of servers and/or software components that operate to perform various processes related to retrieval of part information, determining an issue with a part, identifying what caused the issue with the part, and/or establishing patterns related to parts receiving. In some embodiments, the networked system includes the sensors 54. In other embodiments, the sensors 54 are separate from the networked system. In some embodiments, the output 56 of the sensors 54 is input into a computer connected to DATG 50 via network 66.

In several embodiments, input 52 is an image, video, or the like. In one or more embodiments, input 52 is a bar code, quick-response "QR" code, or an alternative scannable link. In some embodiments, input 52 is a value such as a weight, dimensions, number of packages, number of parts, and the like. In one or more embodiments, input 52 is an invoice. In some embodiments, input 52 is an inventory list. In one or more embodiments, input 52 includes information of where a part is in the supply chain such as information found on a Kanban. In some embodiments, input 52 is input by a user to be fed into the inventory parts identifier 58 and/or the error detection module 60. In some embodiments, input 52 is read by one or more of the sensors 54.

In some embodiments, a plurality of sensors 54 are used to identify, using the inventory and parts identifier 58, number or parts or packages in real-time. In other embodiments, only a single sensor of the sensors 54 is used. In some embodiments, the sensors include at least two of: one or more cameras 70, one or more LIDAR sensors 72, one or more barcode scanners 74, or one or more weight sensors 76. In some embodiments, cameras 70 is one or more vision sensors including, but not limited to: a videographic camera, a photographic camera, or a thermal camera. In various embodiments, the one or more cameras 70 are motion tracking. In one or more embodiments, the one or more cameras 70 are trained (by the learning module 62) to track repetitive motion over a period of time (i.e., a cycle). For example, in one or more embodiments, a part may be moved from a package and placed in bin, and each time the part is moved from the package may be one cycle. The one or more cameras 70 may be trained to track the motion and identify if a part was moved from the package to the bin, in one or more embodiments. In some embodiments, one or more of the cameras 70 are instead one or more LIDAR sensors 72. The one or more LIDAR sensors 72 may be a flash LIDAR, a scanning LIDAR, time of flight LIDAR, a frequency-modulated continuous wave LIDAR, or the like. In some embodiments, the one or more barcode scanners 74 measure QR codes or other scannable links. In several embodiments, the one or more weight sensors 76 are coupled to the floor. In one or more embodiments, the one or more weight sensors 76 may be a strain gauge, capacitance sensor, hydraulic, pneumatic, or the like.

In some embodiments, output 56 corresponds at least a portion of the input 52. For example, in some embodiments, the output 56 may display two packages on a pallet in an image and the input 52 may be an invoice that says two packages on a pallet are expected. In one or more embodiments, output 56 is different than the input 52. For example, the input 52 may have the inventory list that lists four parts weighing fifty pounds total, but the output may be thirty pounds total. In some embodiments, the output 56 includes additional processing such as image processing, machine learning/artificial intelligence, and the like. In some embodiments, trained data sets are used to identify parts in the output 56 such as an image or video. In one or more embodiments, the output image may include graphical representations overlaid on the image identifying the parts in an image or video. In some embodiments, output 56 includes one or more of invoices 78, weight of freight 80, number of parts 82, number of empty packages 84, number of packages 86. In other embodiments, output 56 includes only one of: 56 may include invoices 78, weight of freight 80, number of parts 82, number of empty packages 84, number of packages 86.

In some embodiments, inventory and parts identifier 58 is one or more software modules including code, programming object, programming structure, or combinations thereof. In one or more embodiments, the one or more software modules comprise, by way of nonlimiting examples, a web application, a mobile application, and a standalone application. In various embodiments, software modules are in more than one computer program or application. In some embodiments, the software modules are hosted by more than one machine. In some embodiments, the software modules are hosted by more than one machine in more than one location. In some embodiments, the inventory and parts identifier 58 is also in communication and/or operably coupled to the learning module 62. In various embodiments, the inventory and parts identifier 58 has a separate learning module used to train data sets related to identifying parts and inventory. In some embodiments, at least a portion of the output 56 is transmitted via network 66 and/or input directly into the inventory and parts identifier 58. In other embodiments, all of the output 56 is transmitted via network 66 and/or input directly into the inventory and parts identifier 58.

In some embodiments, error detection module 60 is one or more software modules including code, programming object, programming structure, or combinations thereof. In one or more embodiments, the one or more software modules comprise, by way of nonlimiting examples, a web application, a mobile application, and a standalone application. In various embodiments, software modules are in more than one computer program or application. In some embodiments, the software modules are hosted by more than one machine. In some embodiments, the software modules are hosted by more than one machine in more than one location. In some embodiments, error detection module 60 is in communication and/or operably coupled to the learning module 62. In some embodiments, the error detection module 60 is in communication with the inventory and parts identifier 58. In some embodiments, the error detection module 60 is part of the same application as the inventory and parts identifier module 58. In some embodiments, at least a portion of the output 56 is transmitted via network 66 and/or input directly into the error detection module 60.

In several embodiments, the learning module 62 is one or more software modules including code, programming object, programming structure, or combinations thereof. In one or more embodiments, the one or more software modules comprise, by way of nonlimiting examples, a web application, a mobile application, and a standalone application. In various embodiments, software modules are in more than one computer program or application. In some embodiments, the software modules are hosted by more than one machine. In some embodiments, the software modules are hosted by more than one machine in more than one location. In some embodiments, the learning module 62 retrieves training sets stored in the database 64. In various embodiments, the learning module 62 updates training sets based on output of the error detection module 60 and transmits the updated training sets to the database 64 to be stored. In one or more embodiments, the learning module 62 is in communication with the inventory and parts identifier 58. In several embodiments, the learning module 62 updates training sets based on output of the inventory and parts identifier 58 and transmits the updated training sets to the database 64 to be stored. In several embodiments, the learning module 62 is in communication with the plurality of sensors 54. In various embodiments, the learning module 62 is in communication with the inventory and parts identifier 58.

In one or more embodiments, the database 64 stores threshold values for the sensor data (e.g., weight information of parts, size information of parts, etc.). In some embodiments, the database 64 stores invoices and inventory lists. In one or more embodiments, the database 64 stores route information for a part. In one or more embodiments, the database 64 stores historical information related to other parts receiving errors (such as missing parts, location of missing parts, worker information, supplier information, and the like). In various embodiments, the database 64 stores data sets created by the learning module 62. In some embodiments, the database 64 stores invoices, route information, employee information, forklift information, etc. For example, the database 64 may store the set of forklifts assigned to a dock, people assigned to drive one or more of the forklifts of the set of forklifts assigned to the dock, the set of containers (such as parts or packages) arriving at the dock, set of shopfloor areas of the parts receiving area such as an empty container or pallet staging area, pilot build area, lineside trails area, etc., set of vehicles used to move the set of containers from the dock, set of labels associated with each container, set of Kanbans associated with the invoice, route information for each container, and the like. In some embodiments, the database 64 is in communication with and/or operably coupled to the inventory and parts identifier.

In some embodiments, the network 66 may include a 3G network, a 4G Network, a 5G network, Wi-Fi network, wide area network (WAN), local area network (LAN) or the like. In one or more embodiments, the network 66 is in communication with a central server (e.g., a cloud server). In one or more embodiments, the central server may provide information and services including but not limited to include inventory lists, invoices, weights information, a route for the part, stored sensor data, stored threshold values for the sensor data, and the like, which may form all or a portion of the database 64. In one or more embodiments, external communication (including but not limited to software updates, firmware updates, data transmission) may be accomplished using any suitable wireless or wired communication technology, e.g., a cable interface such as a USB, micro-USB, Lightning, Bluetooth, or the network 66.

In various embodiments, the one or more computing devices 68 include a graphical user interface and a display. In some embodiments, alerts, notifications, and reports, described herein, are displayed on the graphical user interface of the one or more computing device 68. In some embodiments, the one or more computing devices 68 are located at another location (away from a parts receiving area).

In operation, input 52 is scanned, imaged, and/or sensed by sensors 54. The sensors 54 produce an output 56. The output 56 is sent to the inventory and parts identifier 58 in order to identify a characteristic of the output 56 to determine if an error is present. If an error is present, the error is sent to the error detection module 60. The error detection module 60 may retrieve information stored in the database 64, receive present data from sensors 54, use machine learning/artificial intelligence algorithms, and the like to find a source for the error. Once a source has been determined, the error detection module 60 sends an alert and/or report over the network 66 to the one or more computing devices 68. Some of the information in the report may be used by the learning module 62 to update the machine learning/artificial intelligence algorithm to further train the data set. Some of the information in the report may be stored in the database 64.

In operation, in at least one example embodiment, a barcode on a package is scanned by barcode scanner 74. The output 56 includes information about the contents of the package such as number of parts 82, weight of the freight 80, etc. The output 56 may, for example, read that the weight of each part is 5 lbs and that the total weight of the package is 105.6 lbs, which includes the weight of the cardboard box. The package is then placed on weight sensor 76 and to get the weight of the freight 80. However, the output 56 reads the weight of the total package as 100.6 lbs. The inventory and parts identifier 58 may recognize an error has occurred as the expected weight was 105.61 lbs but the actual weight was 100.61 lbs. Therefore, the inventory and parts identifier 58 determines that one part is missing. The inventory and parts identifier 58 sends this information, in real time, to the error detection module 60. The error detection module 60 may use camera 70 to locate the missing part in a scrap bin. The error detection module 60 may generate a report to send via network 66 to one or more computing device 68. In some embodiments, the report may include information for where the part went missing, when the label should have been updated, and/or patterns relating to the missing part. For example, the error detection module 60 may recognize that a certain percentage of parts from a particular supplier get scrapped.

In some embodiments, a plurality of outputs are transmitted via network 66 to the inventory and parts identifier 58 and/or the error detection module 60. In several embodiments, a plurality of sensors 54 are used by the inventory and parts identifier 58 and/or the error detection module 60. In various embodiments, the error detection module 60 is in direct communication with sensors 54. In one or more embodiments, the error detection module 60 may send commands to the sensors 54 and/or the inventory and parts identifier 58. For example, in some embodiments, the error detection module 60 may send a command to the inventory and parts identifier 58 to use the sensors 54 to identify a part with a particular part number.

Figure 3:
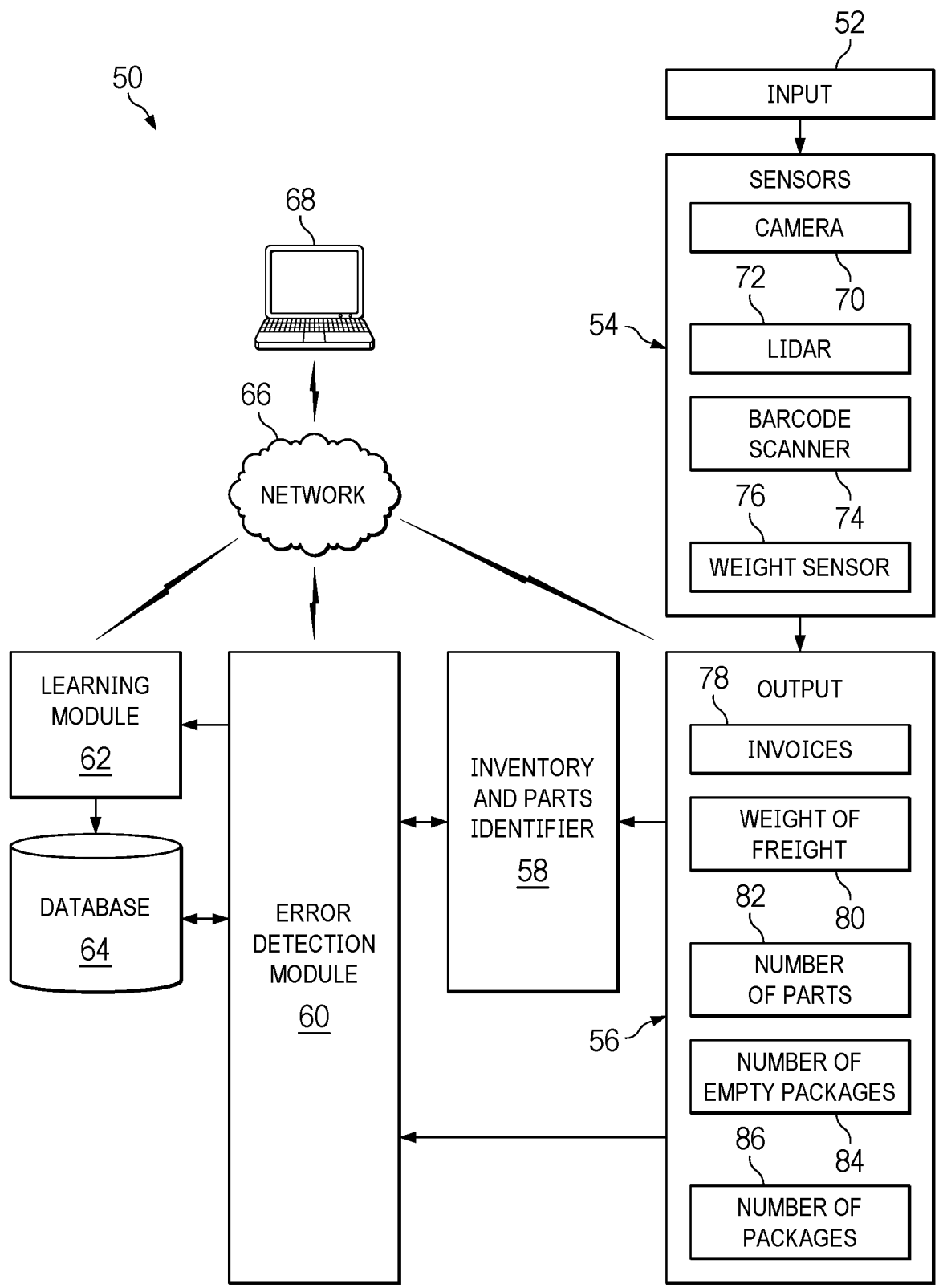
FIG. 3 is a diagrammatic illustration of the DATG of FIG. 2 in accordance with one or more embodiments.

FIG. 3 may illustrate, for example, a portion of the parts receiving gatekeeping sub-system 14 of FIG. 1, the DATG 22 of the gatekeeping system 10 of FIG. 1, a portion of the parts receiving gatekeeping sub-system 24 of FIG. 2, and/or the DATG 40 of FIG. 2. The illustration of the DATG 50 in FIG. 3 is not meant to imply physical or architectural limitations to the manner in which an example embodiment may be implemented. Other components in addition to or in place of the ones illustrated may be used. Some components may be optional. Also, some blocks are presented to illustrate functional components. One or more of the blocks in FIG. 3 may be combined, divided, or combined and divided into different blocks when implemented in an example embodiment.

Figure 4:
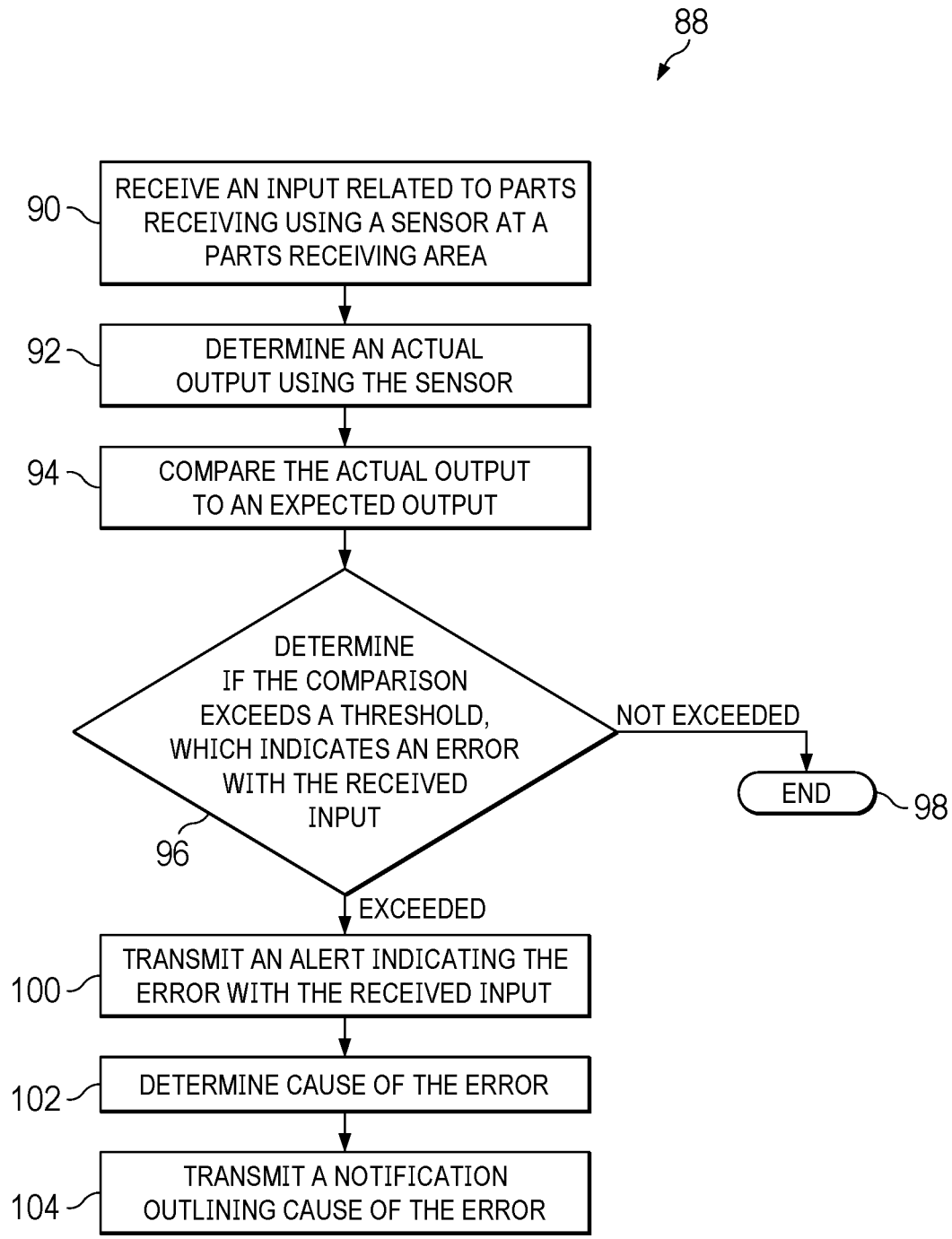
FIG. 4 is a flowchart of a method for implementing the DATG of FIG. 3 in accordance with one or more embodiments

With reference to FIG. 4 and continuing reference to FIGS. 1-3, a method 88 for implementing the DATG 50 of FIG. 3 according to one or more embodiments. Method 88 is illustrated as a set of operations or blocks 90 through 104 and is described with continuing reference to FIG. 3. Not all of the illustrated blocks 90 through 104 may be performed in all embodiments of method 88. One or more blocks that are not expressly illustrated in FIG. 4 may be included before, after, in between, or as part of the blocks 90 through 104. In some embodiments, one or more of the blocks 90 through 104 may be implemented, at least in part, by the DATG 50, in the form of executable code stored on non-transitory, tangible, machine-readable media that when run by one or more processors may cause the one or more processors to perform one or more of the processes. In one or more embodiments, the blocks in method 88 are performed within a parts receiving area, such as the parts receiving area 30 in FIG. 2, by any of the DATG described herein.

In an example embodiment, the method 88 includes: receiving input related to parts receiving using a sensor at a parts receiving area at a block 90; determining an actual output using the sensor at a block 92; comparing the actual output to an expected output at a block 94; determining if the comparison exceeds a threshold, which indicates an error with the received input at a block 96; if the comparison does not exceed a threshold, then the method ends at a block 98; if the comparison does exceed a threshold, then proceed to transmitting an alert indicating the error with the received input at a block 100; determining cause of the error at a block 102; and transmitting a notification outlining the cause of the error at a block 104.

In some embodiments, the block 90 occurs automatically. For example, when a package is placed on a weight sensor. In other embodiments, input is received at the request of a user or in response to a user action such as scanning a barcode. In various embodiments, a plurality of inputs are received relating to a plurality of parts. In some embodiments, a plurality of inputs are received about a single part. In various embodiments, a value, parameter, dimension, bar code, QR code, Kanban card, weight or the like is the input. In some embodiments, the input is an image, video, recording, thermal image, LIDAR scan, and the like. In one or more embodiments, a sensor scans information from a scannable code like a barcode or QR code to retrieve an inventory list, parts information, packaging information, or other parts receiving information.

In some embodiments, the block 92 also includes sending the actual output via a network like network 66 to the DATG 50. In some embodiments, the block 92 includes further processing such as image processing known to those skilled in the art of image processing, artificial intelligence and machine learning to identify parts in an image, video, or scan. In some embodiments, the block 92 includes comparing the actual output to training data created by a learning module such as the learning module 62 to identify parts in an image, video, or scan such as a LIDAR scan. In some embodiments, the actual output corresponds to the received input. For example, the weight of a package is the input, and the output is a value of the weight of the package. In other embodiments, the actual output is separate from the input such as a barcode as an input and the output could be an inventory list, invoice, or parts information. In some embodiments, the sensor displays the actual output at the block 92. In other embodiments the actual output is sent to the DATG 50 for processing.

In various embodiments, the block 94 includes comparing two outputs from two different sensors at the parts receiving area. For example, the output of a barcode scan may retrieve an invoice which records fifteen parts; however, the output of the camera image shows only ten parts. The fifteen parts and ten parts are compared to create a comparison value which can be compared to a stored threshold value or range, in some embodiments. In several embodiments, the block 94 includes comparing a stored expected output which may be stored in a database such as database 64 versus the actual output of the scanned input. The stored expected output is compared to the actual output to create a value or threshold. In other embodiments, the database stores a threshold value for each output type (e.g., weight of a part, dimension of a part, number of packages per pallet, etc.). In some embodiments, at the block 94 the actual output is compared to another sensor output to create a comparison value. The comparison value may be compared to the stored threshold value at the block 94. In some embodiments, the block 94 is implemented by the DATG 50. In one or more embodiments, the inventory and parts identifier 58 of the DATG 50 implements block 94.

In some embodiments, the block 96 occurs automatically after the block 94. In several embodiments, the comparison is sent from the inventory and parts identifier 58 to the detection error module 60 in order to implement block 96. In some embodiments, the block 96 is implemented by the DATG 50. In one or more embodiments, the detection error module 60 of the DATG 50 implements block 96. In several embodiments, the comparison value may be outside the threshold value or range stored by the database such as database 64. The comparison may exceed the threshold by being either above or below the threshold, which indicates one or more additional parts or one or more missing parts, respectively. In some embodiments, the threshold is a numerical value or a numerical range (such as plus or minus one, 2-4 lbs, etc.). In other embodiments, the comparison value exceeds the threshold if the actual output is different than the expected output at the block 96. In one or more embodiments, if the comparison value results in an identical value (e.g., 5 lbs and 5 lbs, 4 boxes and 4 boxes, etc.), then the threshold is not exceeded at the block 96.

In several embodiments, block 98 is omitted. Instead, some embodiments, repeat blocks 92-96 using different inputs to continually monitor parts receiving.

In various embodiments, block 100 is omitted and block 96 proceeds directly to block 102. In some embodiments, block 100 transmits an alert to a device such as a computing device such as computing device 68, a mobile device, a laptop, or the like at the parts receiving area (such as parts receiving area 30). The alert may be an auditory and/or visual alert displayed on a graphical user interface of the computing device. The alert may indicate an error with the parts receiving such as a missing part or an additional part. The alert may signal an investigation of the source of the error. In some embodiments, to proceed to block 102, a user directs the system such as DATG 50 to determine the cause of the error and/or the location of the missing part.

In one or more embodiments, the block 102 determines cause of the error determined in the block 96 automatically. In some embodiments, the block 102 determines the cause of the error using a plurality of sensors positioned throughout a parts receiving area to determine where the part went missing. For example, a camera may locate the missing in a different section of the parts receiving area. Another example, not meant to be limiting, a camera at the dock may have recorded an image showing that the part was missing even when it was unloaded at the dock from the suppliers. In one or more embodiments, the block 102 may also determine the cause of the error and identify a pattern with the error. For example, if the part was missing due to a fault of the supplier, the block 102 may identify a pattern that the supplier continuously makes shipping errors related to this part. Other non-limiting examples, at the block 102, include if plurality of errors occur over a period of time a pattern may be determined such as worker B places more parts in the scrap bin than worker A, worker B fails to update the inventory list when worker B places an item in the scrap bin, worker A opens a new package of parts before finishing an old package of parts, which is leading to missing parts, etc. In some embodiments, the block 96 is implemented by the DATG 50. In one or more embodiments, the detection error module 60 of the DATG 50 implements block 96. In some embodiments, the block 96 includes pulling saved sensor data from a database such as database 64. In several embodiments, the block 96 includes instructing a worker to collect new sensor data and/or instructing the sensors to send updated data for analysis and/or processing.

In one or more embodiments, block 104 occurs automatically when block 102 finishes. In some embodiments, block 104 is omitted if no cause of the error could be determined the block 102. In various embodiments, the DATG 50 transmits an alert, notification, and/or report to a computing device over a network (such as computing device 68 and network 66). In many embodiments, the computing device is located remote from the parts receiving area and/or is a different computing device than the one described at block 100. For example, the report generated by the DATG 50 may be sent to management and/or operations to improve efficiency, identify supplier issues, and identify where and why parts are missing or mishandled; whereas the alert indicating an error with the received input may be sent to the worker on the parts receiving area to let the worker know that there is a problem. In some embodiments, the report is generated using machine learning and/or the learning module 62 to determine a pattern related to the error (such as, but not limited to, how long to respond to the error, when was the error reported, supplier A sends a percentage of defective parts every week, part A sourced from supplier A is rated defective and removed from the line at a higher percentage than part A sourced from supplier B, etc.). In several embodiments, using machine learning, a graph showing the pattern is displayed at the block 104. The block 104 may include, in various embodiments, sensor data such as video footage, graphs, time reports, supplier information, patterns relating to errors with a part, package, or supplier, and the like.

Figure 5:
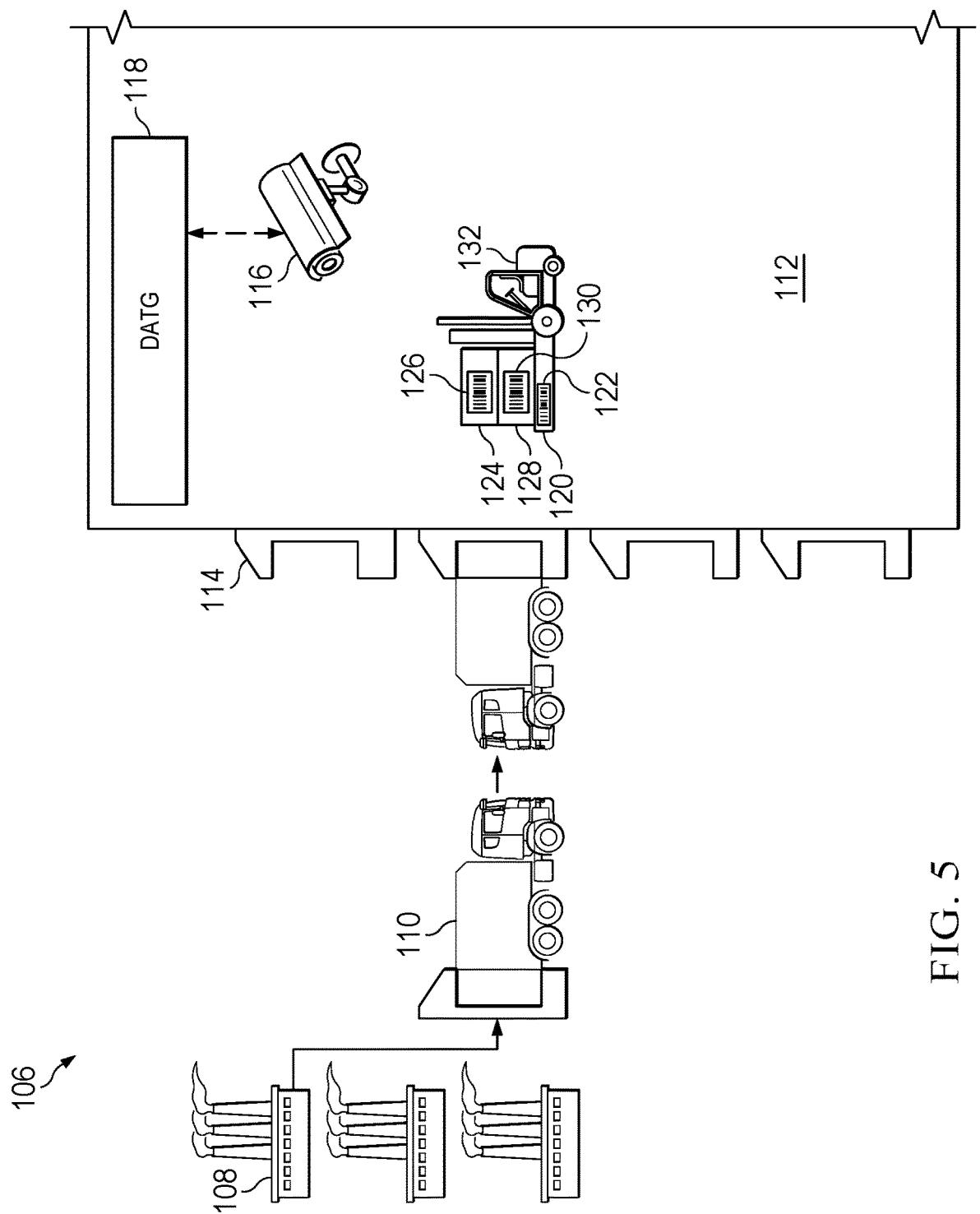
FIG. 5 is a diagrammatic illustration of a portion of the parts receiving gatekeeping sub-system of FIG. 2 in accordance with one or more embodiments.

Referring now to FIG. 5, with continuing reference to FIGS. 1-4, a portion of a parts receiving gatekeeping sub-system, in accordance with one or more embodiments, is shown by reference numeral 106. The portion of the parts receiving gatekeeping sub-system 106 includes suppliers 108, freight 110, and a parts receiving area 112. The parts receiving area 112 includes one or more docks 114, a camera 116, a docking area traceability gatekeeper (DATG) 118, a pallet 120, a first label 122, a first package 124, a second label 126, a second package 128, a third label 130, and a fork-lift 132. The camera 116 is disposed such that the camera 116 images an area around the one or more docks 114. The DATG 118 is in communication with and/or operably coupled to the camera 116. The first label 122 is coupled to the pallet 120. The second label 126 is attached to the first package 124, and the third label 130 is coupled to the second package 128. Solid arrows shown in FIG. 5 represent movement of freight 110, whereas the dotted arrows shown in FIG. 5 show transmission of data.

In operation, freight 110 is loaded at the suppliers 108 and transported from the suppliers 108 to a dock of the one or more docks 114. The freight 110 is unloaded using the fork-lift 132. The fork-lift 132 lifts a portion of the freight 110 and brings the portion of the freight 110 into the parts receiving area 112. The fork-lift 132 carries pallet 120 which is holding the first package 124 and the second package 128. The first package 124 and the second package 128 are disposed on top of the pallet 120 for transport. At the one or more docks 114, a camera 116 is coupled to a wall, ceiling, or other structure to image at least one of the one or more docks 114. The camera 116 may image the freight 110 being unloaded at the one or more docks 114. The camera 116 transmits its imaged data to the DATG 118 for analysis and processing.

In some embodiments, the camera 116 images the first label 122, the second label 126, and/or the third label 130. In various embodiments, the camera 116 may read information from the first label 122, the second label 126, and/or the third label 130. In some embodiments, the camera 116 is a thermal camera. In other embodiments, the camera 116 is a video camera. In one or more embodiments, the camera 116 is a plurality of cameras. In some embodiments, the camera 116 analyzes the dock to determine when an item arrives, when the dock is open or closed, and the like. In some embodiments, the camera 116 transmits image or video data to the DATG 118. In other embodiments, the camera 116 transmits information pulled from the first label 122, the second label 126, and/or the third label 130 (such as inventory information, invoices, and the like). In various embodiments, the camera 116 is wirelessly coupled to the DATG 118 and connected over a network as described herein.

FIG. 5 may illustrate, for example, a portion of the parts receiving gatekeeping sub-system 14 of FIG. 1, the DATG 22 of the gatekeeping system 10 of FIG. 1, a portion of the parts receiving gatekeeping sub-system 24 of FIG. 2, the DATG 40 of FIG. 2, the DATG 50 of FIG. 3, and/or portions of method 88 of FIG. 4.

Figure 6A:
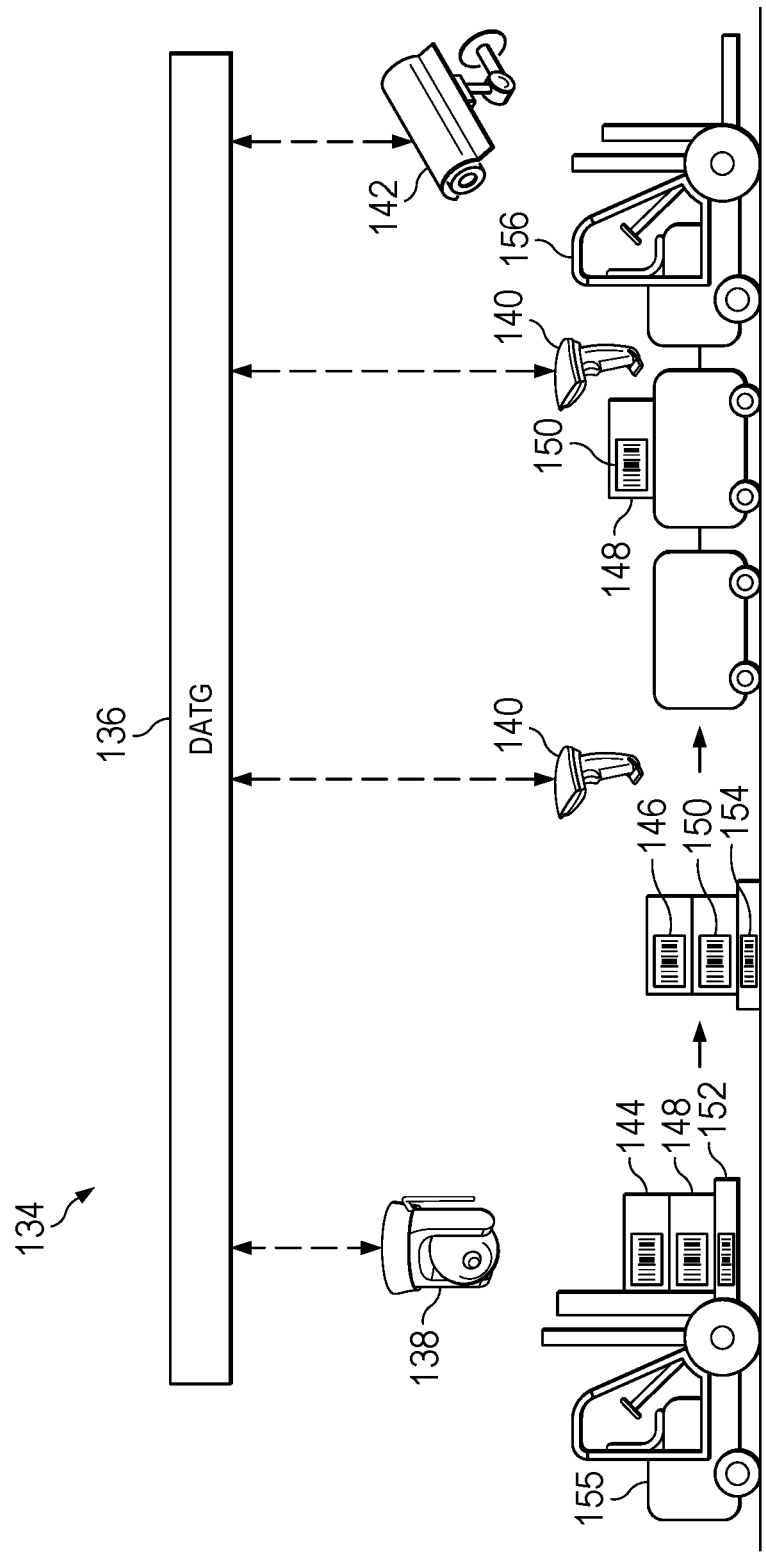
FIG. 6A is a diagrammatic illustration of a system for tracking parts received to identify an error using a Docking Area Traceability Gatekeeper in accordance with one or more embodiments.

Referring now to FIG. 6A, with continuing reference to FIGS. 1-5, a system for tracking parts received using a DATG to identify an error in accordance with one or more embodiments, is shown by reference numeral 134. The portion of the parts receiving gatekeeping sub-system 134 includes a dock area traceability gatekeeper (DATG) 136, a thermal camera 138, a scanner 140, a camera 142, a first package 144, a first label 146, a second package 148, a second label 150, a pallet 152, and a third label 154. The DATG 136 is in communication with and/or operably coupled to the thermal camera 138, the scanner 140, and/or the camera 142. The first label 146 is coupled to the first package 144. The second label 150 is coupled to the second package 148. The third label 154 is coupled to the pallet 152. The portion of the parts receiving gatekeeping sub-system 134 may include a forklift 155 and a vehicle 156. Solid arrows shown in FIG. 6A represent movement of freight such as second package 148, whereas the dotted arrows shown in FIG. 6A show transmission of data.

Figure 6B:
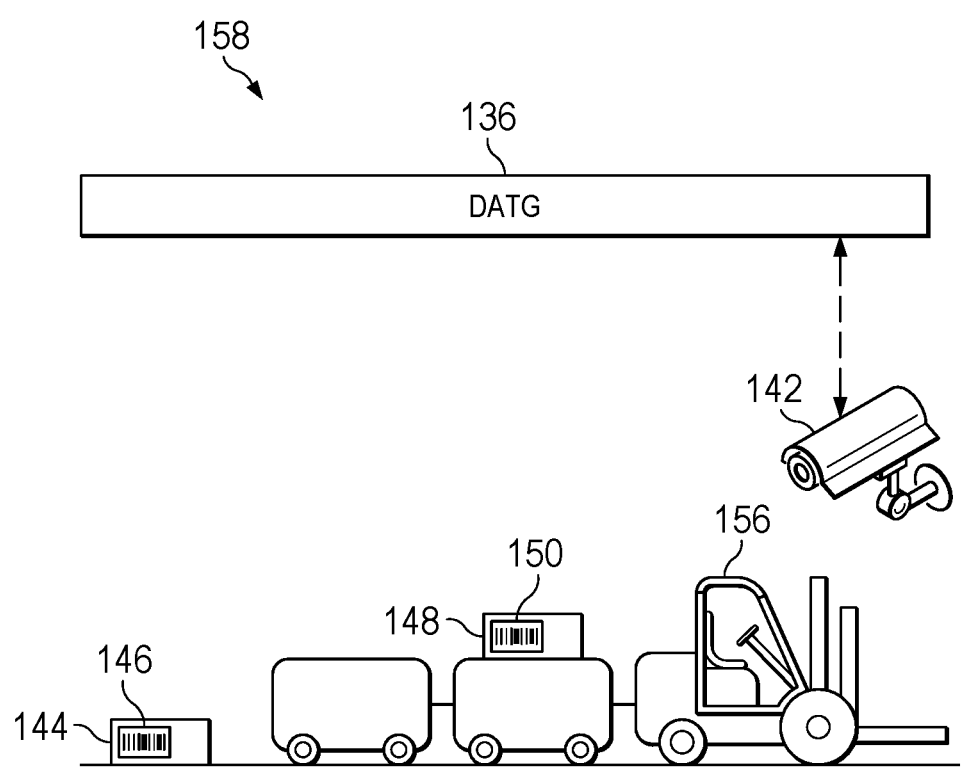
FIG. 6B is a diagrammatic illustration of a system for determining a cause of the error of FIG. 6A in accordance with one or more embodiments.

Referring now to FIG. 6B, with continuing reference to FIG. 6A, a system for determining a cause of the error of FIG. 6A, in accordance with one or more embodiments, is shown by reference numeral 158. The dotted arrows shown in FIG. 6B show transmission of data.

In operation, with continuing reference to FIGS. 6A and 6B, the forklift 155 carries a pallet 152, a first package 144, and a second package 148 from a first area to a second area of a parts receiving area. While in the first area, the thermal camera 138 may image the pallet 152, a first package 144, and/or a second package 148 and transmit thermal images and/or image data to the DATG 136 for analysis and processing. At the second area, the forklift drops off the pallet 152, a first package 144, and a second package 148, where the first label 146, the second label and/or the third label 154 may be scanned by the scanner 140. The scanner 140 transmits information scanned from the first label 146, second label 150, and/or the third label 154 to the DATG 136. Scanning the labels (the first label 146, the second label 150, and/or the third label 154) may provide route information for where each package should be delivered for manufacturing. The route information provides that only the first package 144 and the second package 148 should be placed on vehicle 156. The second package 148 is moved along the provided route using the vehicle 156. The second label 150 of second package 148 may be scanned along the route using the scanner 140. The scanned information may be sent to the DATG 136 for analysis and processing. The second package 148 and/or the second label 150 may also be imaged by the camera 142. The image and/or image data of the camera 142 may be sent to the DATG 136 for analysis and processing. Using the scanned information, the DATG 136 identifies that vehicle 156 should be carrying an additional package (i.e., the first package 144). The DATG 136 identifies that the first package 144 is missing. Once the DATG 136 identifies that the first package 144 is missing, the DATG 136 may use the sensors to locate the missing first package 144 such as by using camera 142. Camera 142 may image the first package 144 and/or the first label 146 and transmit that image and/or image data to the DATG 136 for processing and analysis. The DATG 136 may identify, for example, by the first label 146 in the image provided by camera 142 that the first package 144 corresponds to inventory missing from the scanned information/camera data from camera 142.

In some embodiments, with continuing reference to FIGS. 6A and 6B, the DATG 136 sends an alert to the vehicle 156 that the first package is missing. In various embodiments, the DATG 136 sends an alert to at least one computing device in the parts receiving area alerting a worker of the missing package and another alert to alert the worker of the location of the missing package. In some embodiments, a part is identified as missing or mishandled rather than a package.

In some embodiments, the scanner 140 is two separate scanners at two separate locations. The scanned information may include parts information, contents of the package, weight of package, route information for the package or pallet, invoices, inventory of the entire pallet, and the like. In some embodiments, the scanner information is compared to an invoice, or an inventory list stored in a database and accessible by the DATG.

In some embodiments, a plurality of cameras is used instead of a single camera 142. In some embodiments, the camera rather than the scanner information is used by the DATG 136 to identify a missing package.

In various embodiments, the DATG 136 pulls stored image data from a plurality of cameras including camera 142 to determine when the first package 144 went missing. In one or more embodiments, the DATG 136 provides a report for why the package went missing or creates a pattern if packages consistently go missing from a shipment from a supplier or at this location of the parts receiving area.

In various embodiments, the DATG 136 uses a plurality of sensor data such as data and images from the thermal camera 138, the scanner 140, and the camera 142 to identify missing parts. In some embodiments, the sensors may include or be replaced with LIDAR sensors, weight sensors, and the like and may be placed in a different location along the parts receiving area than the sensors shown in FIG. 6A.

Figure 7A:
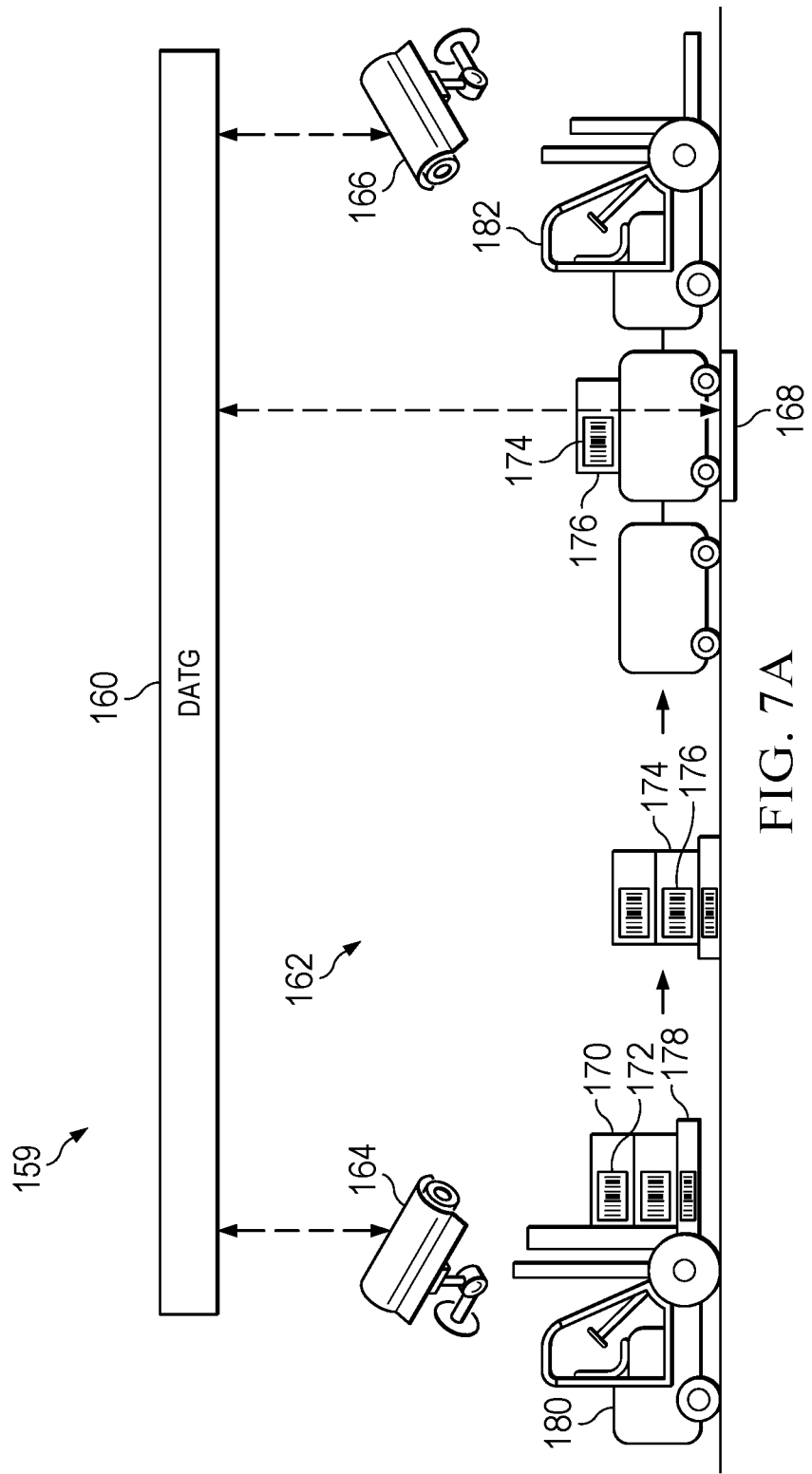
FIG. 7A is another diagrammatic illustration of tracking parts received to identify an error using a Docking Area Traceability Gatekeeper in accordance with one or more embodiments.
Figure 7B:
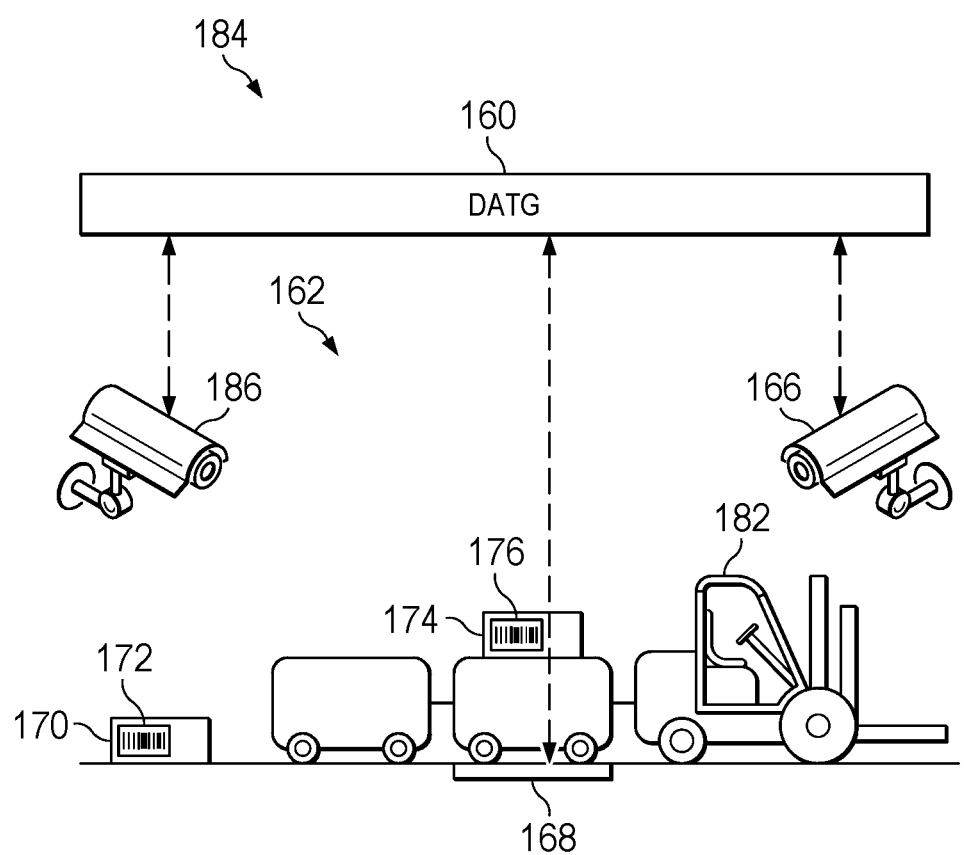
FIG. 7B is a diagrammatic illustration of determining a cause of the error of FIG. 7A in accordance with one or more embodiments.
Figure 8A:
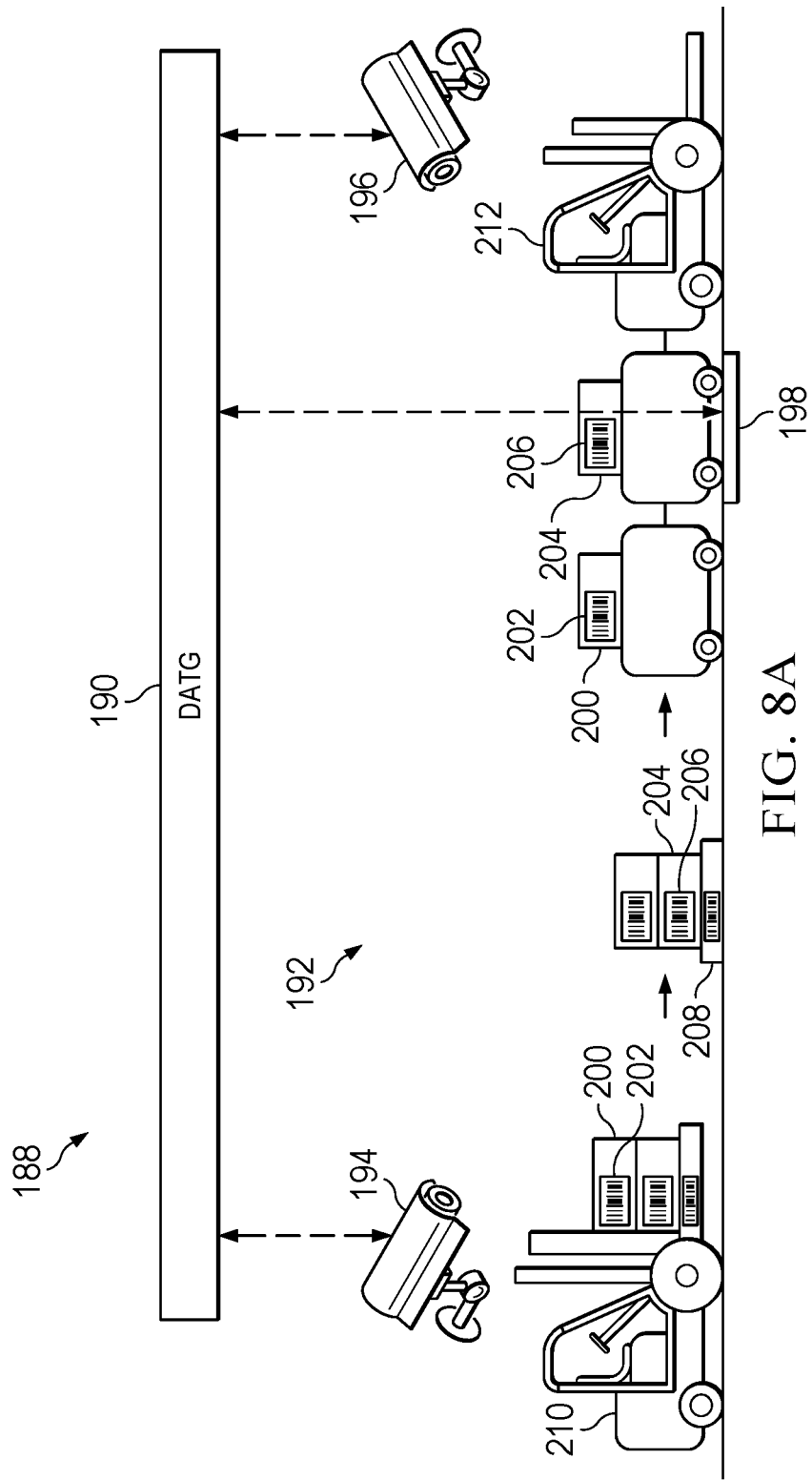
FIG. 8A is a diagrammatic illustration of tracking parts received using a Docking Area Traceability Gatekeeper (DATG) in accordance with one or more embodiments.
Figure 8B:
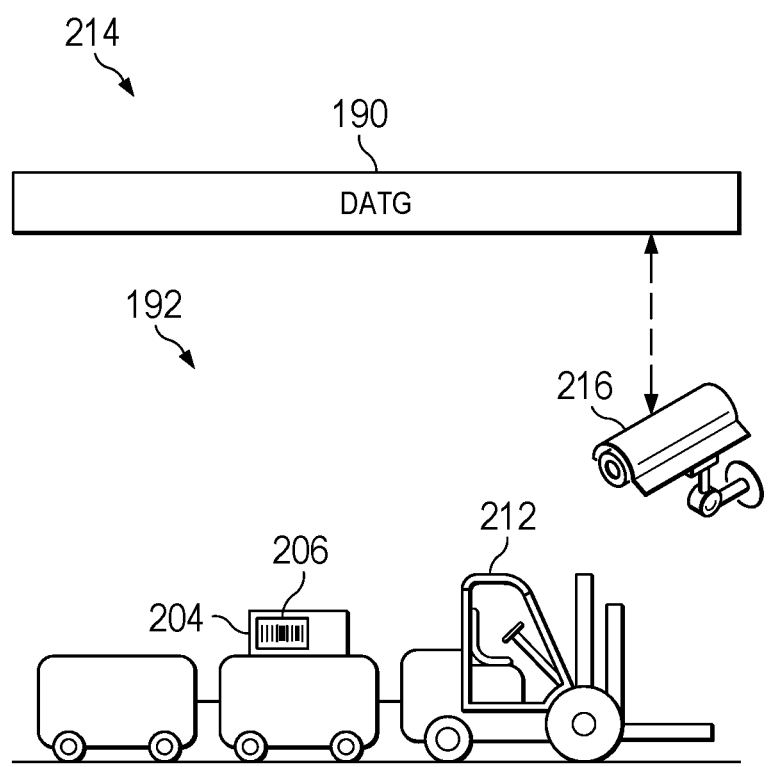
FIG. 8B is a diagrammatic illustration of identifying an error with the tracked parts received of FIG. 8A using the DATG in accordance with one or more embodiments.
Figure 8C:
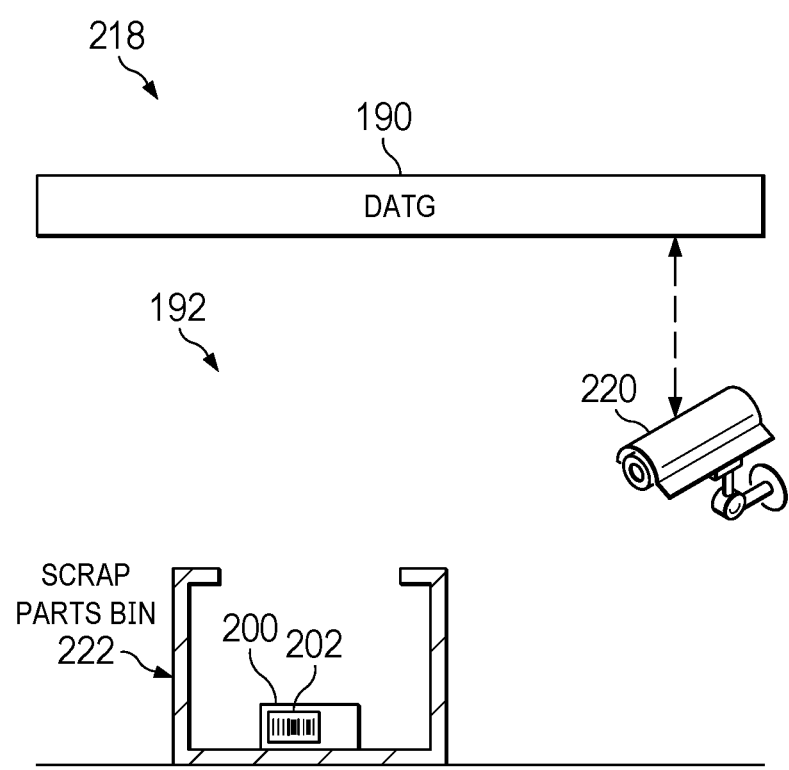
FIG. 8C is a diagrammatic illustration of determining a cause of the error of FIG. 8B in accordance with one or more embodiments.

FIGS. 6A-6B may illustrate, for example, a portion of the parts receiving gatekeeping sub-system 14 of FIG. 1, the DATG 22 of the gatekeeping system 10 of FIG. 1, a portion of the parts receiving gatekeeping sub-system 24 of FIG. 2, the DATG 40 of FIG. 2, the DATG 50 of FIG. 3, portions of method 88 of FIG. 4, the DATG 118 of FIG. 5, DATG 160 of FIGS. 7A-7B, and/or the DATG 190 of FIGS. 8A-C.

Referring now to FIG. 7A, with continuing reference to FIGS. 1-6B, another system for tracking parts received using a DATG to identify an error in accordance with one or more embodiments, is shown by reference numeral 159. The system 159 includes a dock area traceability gatekeeper (DATG) 160 and a parts receiving area 162. The parts receiving area 162 includes a first camera 164, a second camera 166, a weight sensor 168, a first package 170, a first label 172, a second package 174, a second label 176, a pallet 178, a forklift 180, and a vehicle 182. The first camera 164 is in communication with and/or operably coupled to the DATG 160. The second camera 166 is in communication with and/or operably coupled to the DATG 160. The weight sensor 168 may be in communication with and/or operably coupled to the DATG 160. The first label 172 is coupled to the first package 170. The second label 176 is coupled to the second package 174. Solid arrows shown in FIG. 7A represent movement of freight such as second package 174 through the parts receiving area 162, whereas the dotted arrows shown in FIG. 7A show transmission of data.

Referring now to FIG. 7B, with continuing reference to FIG. 7A, a system for determining a cause of the error of FIG. 7A, in accordance with one or more embodiments, is shown by reference numeral 184. The system 184 includes a third camera 186. The third camera 186 is operably coupled to and/or in communication with the DATG 160. The dotted arrows shown in FIG. 7B show transmission of data.

In operation, with continuing reference to FIGS. 7A and 7B, the forklift 180 carries the pallet 178, the first package 170, and the second package 174 from a first area to a second area of the parts receiving area 162. While in the first area, the first camera 164 may image the pallet 178, the first package 170, and/or the second package 174 and transmit images and/or image data to the DATG 160 for analysis and processing. At the second area, the forklift drops off the pallet 178, the first package 170, and the second package 174, where the first label 172 and the second label 176 may be imaged by the first camera 164. The first camera 164 may transmit images, image data, and/or label information to the DATG 160 for analysis and processing. The first package 170 and the second package 174 should be placed on vehicle 182. The second package 174 is moved along the correct route using the vehicle 182. The second label 176 of second package 174 may be scanned/imaged along the route using the second camera 166. The scanned information may be sent to the DATG 160 for analysis and processing. A weight sensor 168 may be used (in addition to, or in alternative to the second camera 166) to measure the weight of the freight of vehicle 182. Using the information provided by the second camera 166 and/or the weight sensor 168, the DATG 160 identifies that vehicle 156 should be carrying an additional package (i.e., the first package 170). The DATG 160 identifies that the first package 170 is missing. Once the DATG 160 identifies that the first package 170 is missing, the DATG 160 may use additional sensors to locate the missing first package 1470 such as third camera 186. Third camera 186 may image the first package 170 and/or the first label 172 and transmit that image and/or image data to the DATG 160 for processing and analysis. The DATG 160 may identify, for example, by the first label 172 in the image provided by third camera 186 that the first package 170 corresponds to inventory missing from the scanned information/camera data from second camera 166 and/or that the first package 170 corresponds to the weight discrepancy shown on the weight sensor 168.

In one or more embodiments, with continuing reference to FIGS. 7A and 7B, the weight sensor 168 may be located on the ground of a parts receiving area 162. The weight sensor 168 may transmit a weight value to the DATG 160. In various embodiments, the DATG 160 may compare the actual weight of the freight measured by the weight sensor 168 with the expected weight listed on an invoice or inventory list. In some embodiments, the weight value produced by the weight sensor 168 is manually transmitted to the DATG 160. In one or more embodiments, only the information provided by the weight sensor 168 is used by the DATG 160 to identify one or more missing parts or packages.

In several embodiments, the parts receiving area 162 is an area with one or more docks, a welding area, or a quality assurance area. In some embodiments, different types of cameras are used at different locations in the parts receiving area 162. In various embodiments, a plurality of sensors of a plurality of types are used in the parts receiving area 162 as described herein.

In some embodiments, the DATG 160 notifies a worker where the first package 170 is located in the parts receiving area 162. In one or more embodiments, the DATG 160 notifies a worker or management the reason for why the first package 170 went missing. For example, the missing first package 170 may have been placed in an incorrect stack, may have been placed in a scrap bin, may have been left in a different larger package, etc.

FIGS. 7A-7B may illustrate, for example, a portion of the parts receiving gatekeeping sub-system 14 of FIG. 1, the DATG 22 of the gatekeeping system 10 of FIG. 1, a portion of the parts receiving gatekeeping sub-system 24 of FIG. 2, the DATG 40 of FIG. 2, the DATG 50 of FIG. 3, portions of method 88 of FIG. 4, the DATG 118 of FIG. 5, the DATG 136 of FIGS. 6A-B, and/or the DATG 190 of FIGS. 8A-8C.

Referring now to FIG. 8A, with continuing reference to FIGS. 1-7B, a system for tracking parts received in accordance with one or more embodiments, is shown by reference numeral 188. The system 188 includes a dock area traceability gatekeeper (DATG) 190 and a parts receiving area 192. The parts receiving area 192 includes a first camera 194, a second camera 196, a weight sensor 198, a first package 200, a first label 202, a second package 204, a second label 206, a pallet 208, a forklift 210, and a vehicle 212. The first camera 194 is in communication with and/or operably coupled to the DATG 190. The second camera 196 is in communication with and/or operably coupled to the DATG 190. The first camera 194 is located in a different portion of the parts receiving area 192 than the second camera 196. The weight sensor 198 may be in communication with and/or operably coupled to the DATG 190. The first label 202 is coupled to the first package 200 The second label 206 is coupled to the second package 204. Solid arrows shown in FIG. 8A represent movement of freight such as the first package 200 and the second package 204 through the parts receiving area 192, whereas the dotted arrows shown in FIG. 8A show transmission of data.

Referring now to FIG. 8B, with continuing reference to FIG. 8A, a system for identifying an error using the DATG 190 of FIG. 8A, in accordance with one or more embodiments, is shown by reference numeral 214. The system 214 includes a third camera 216. The third camera 216 is operably coupled to and/or in communication with the DATG 190. The third camera 216 is located at another portion of the parts receiving area 192 than the first camera 194 and the second camera 196. The dotted arrows shown in FIG. 8B show transmission of data.

Referring now to FIG. 8C, with continuing reference to FIGS. 8A-8B, a system, using the DATG 190, for determining a cause of the error of FIG. 8B, in accordance with one or more embodiments, is shown by reference numeral 218. The system 218 includes a fourth camera 220 and a scrap parts bin 222. The fourth camera 220 is operably coupled to and/or in communication with the DATG 190. The fourth camera 220 and the scrap parts bin 222 are located in the parts receiving area 192. The dotted arrows shown in FIG. 8C show transmission of data.

In operation, with continuing reference to FIGS. 8A-8C, the forklift 210 carries a pallet 208, a first package 200, and a second package 204 from a first area to a second area of the parts receiving area 192. While in the first area, the first camera 194 may image the pallet 178, the first package 200, and/or the second package 204 and transmit images and/or image data to the DATG 190 for analysis and processing. At the second area, the forklift drops off the pallet 208, the first package 200, and the second package 204, where the first label 202 and the second label 206 may be imaged by the first camera 194. The first camera 194 may transmit images, image data, and/or label information to the DATG 190 for analysis and processing. The first package 200 and the second package 204, based on route information, which may be provided on the labels, should be placed on vehicle 212. The first package 200 and the second package 204 is moved along the correct route using the vehicle 212. The first label 202 of the first package 200 and the second label 206 of second package 204 may be scanned/imaged along the route using the second camera 196. The scanned/imaged information may be sent to the DATG 190 for analysis and processing. A weight sensor 198 may be used (in addition to, or in alternative to the second camera 196) to measure the weight of the freight of vehicle 212. Using the information provided by the second camera 196 and/or the weight sensor 198, the DATG 190 identifies that vehicle 212 is carrying the appropriate number of packages and/or has the appropriate weight amount. The vehicle 212 continues to travel along the parts receiving area from the second area to a third area. The third camera 216 images/scans the second label 205 of the first package 200, but the third camera 216 does not scan or image the first label 202 of the first package 200. The DATG 190 identifies that the first package 200 is missing, using the third camera 216. Once the DATG 190 identifies that the first package 200 is missing, the DATG 190 may use additional sensors or stored sensor data to locate the missing first package 200 such as the fourth camera 220. The fourth camera 220 may image the first package 200 and/or the first label 202 and transmit that image and/or image data to the DATG 190 for processing and analysis. The DATG 190 may identify, for example, by the first label 202 in the image provided by third camera 216 that the first package 200 corresponds to inventory missing from the scanned information/camera data from the third camera 216. The DATG 190 may also use the data from the fourth camera 220 to identify that the first package 200 was placed in the scrap parts bin 222.

In some embodiments, the DATG 190 will notify management that a certain percentage of a supplier's parts are ending up in the scrap parts bin 222. The scrap parts bin may indicate that the part was broken, damaged, mislabeled, or otherwise unusable. The DATG 190 may also use information stored in a database to detect patterns related to which parts end up in the scrap parts bin 222 relating to part type, supplier information, and the like. In some embodiments, a report is generated by the DATG 190 showing which part went missing, where the part went missing, why the part went missing, and the like. In one or more embodiments, the DATG 190 notifies management to investigate a part, a supplier, or worker based on the number errors (such as being missing or placing the part in the scrap parts bin 222) or pattern generated by the DATG 190.

In other embodiments, rather than being placed in the scrap parts bin 222, a missing part may be found in an opened package that was not fully emptied before opening a new package.

FIGS. 8A-C may illustrate, for example, a portion of the parts receiving gatekeeping sub-system 14 of FIG. 1, the DATG 22 of the gatekeeping system 10 of FIG. 1, a portion of the parts receiving gatekeeping sub-system 24 of FIG. 2, the DATG 40 of FIG. 2, the DATG 50 of FIG. 3, portions of method 88 of FIG. 4, the DATG 118 of FIG. 5, the DATG 136 of FIGS. 6A-B, and/or the DATG 160 of FIGS. 7A-B.

Figure 9:
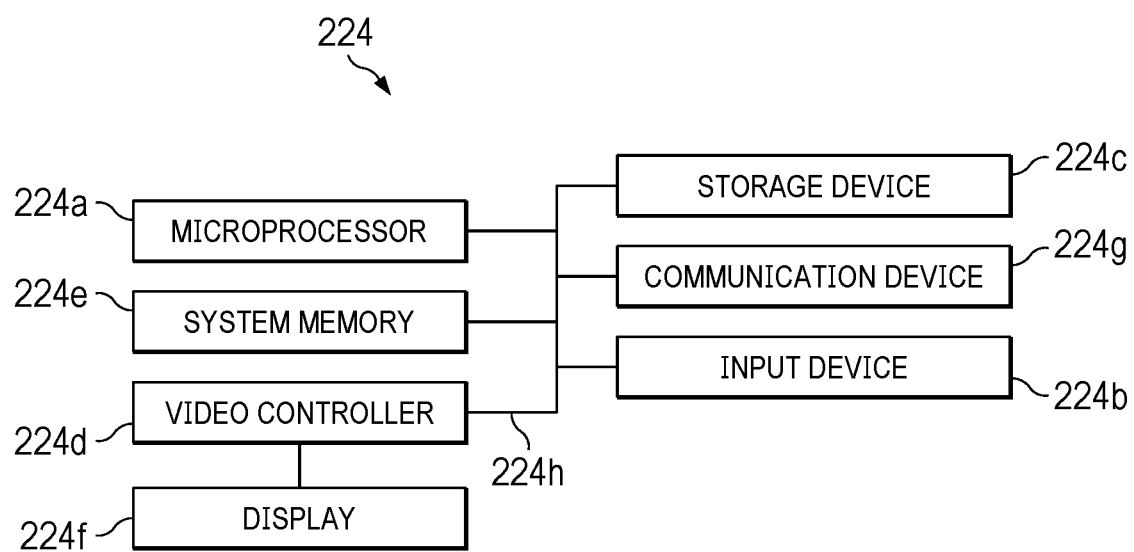
FIG. 9 is an illustrative node for implementing one or more example embodiments of the present disclosure, according to an example embodiment.

In an example embodiment, as illustrated in FIG. 9 with continuing reference to FIGS. 1-8C, an illustrative node 224 for implementing one or more of the example embodiments described above and/or illustrated in FIGS. 1-8C is depicted. The node 224 includes a microprocessor 224a, an input device 224b, a storage device 224c, a video controller 224d, a system memory 224e, a display 224f, and a communication device 224g all interconnected by one or more buses 224h. In several example embodiments, the storage device 224c may include a flash memory, virtual cloud storage, high-capacity storage, edge devices, a floppy drive, hard drive, CD-ROM, optical drive, any other form of storage device and/or any combination thereof. In several example embodiments, the storage device 224c may include, and/or be capable of receiving, a high-performance server, high performance artificial intelligence cluster, storage server, a floppy disk, CD-ROM, DVD-ROM, or any other form of non-transitory computer-readable medium that may contain executable instructions. In several example embodiments, the communication device 224g may include a modem, network card, or any other device to enable the node to communicate with other nodes. In several example embodiments, any node represents a plurality of interconnected (whether by intranet or Internet) computer systems, including without limitation, personal computers, workstations, mainframes, PDAs, smartphones, cell phones, and single board computers.

In several example embodiments, one or more of the components of the systems described above and/or illustrated in FIGS. 1-8C include at least the node 224 and/or components thereof, and/or one or more nodes that are substantially similar to the node 224 and/or components thereof. In several example embodiments, one or more of the above-described components of the node 224, the system, and/or the example embodiments described above and/or illustrated in FIGS. 1-8C include respective pluralities of same components.

In several example embodiments, one or more of the applications, systems, and application programs described above and/or illustrated in FIGS. 1-8C include a computer program that includes a plurality of instructions, data, and/or any combination thereof; an application written in, for example, Arena, Hypertext Markup Language (HTML), Cascading Style Sheets (CSS), JavaScript, Extensible Markup Language (XML), asynchronous JavaScript, serve-side JavaScript (NodeJS), and XML (Ajax), and/or any combination thereof; a web-based application written in, for example, Java or Python, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a flash memory, virtual cloud storage, high-capacity storage, or a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices, and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a non-transitory computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessors 224a, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different blocks, processes, and procedures are described as appearing as distinct acts, one or more of the blocks, one or more of the processes, and/or one or more of the procedures may also be performed in different orders, simultaneously, and/or sequentially. In several example embodiments, the blocks, processes and/or procedures may be merged into one or more blocks, processes, and/or procedures.

In several example embodiments, one or more of the operational blocks in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

The phrase "at least one of A and B" should be understood to mean "A; B; or both A and B." The phrase "one or more of the following: A, B, and C" should be understood to mean "A; B; C; A and B; B and C; A and C; or all three of A, B, and C." The phrase "one or more of A, B, and C" should be understood to mean "A; B; C; A and B; B and C; A and C; or all three of A, B, and C."

Although several example embodiments have been described in detail above, the embodiments described are examples only and are not limiting, and those skilled in the art will readily appreciate that many other modifications, changes, and/or substitutions are possible in the example embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112 (f) for any limitations of any of the claims herein, except for those in which the claim expressly uses the word "means" together with an associated function.

What is claimed is:

1. A computer-implemented method for identifying parts and determining errors in parts receiving at a parts receiving area, the computer-implemented method comprising:
   determining an output using a first sensor, wherein the output is associated with at least one parts container;
   comparing the output to a stored expected output;
   determining that the comparison exceeds a threshold, wherein the comparison exceeding the threshold indicates an error with parts receiving;
   determining, using a second sensor, a cause of the error, in response to determining that the comparison exceeded the threshold; and
   outputting, to a display, a notification about the cause of the error.

2. The computer-implemented method of claim 1, wherein the first sensor comprises at least one of: a weight sensor or barcode scanner.

3. The computer-implemented method of claim 1, wherein the second sensor comprises: a LIDAR sensor, a thermal camera, or a camera.

4. The computer-implemented method of claim 1, further comprises:
   accessing inventory information stored in a database for the at least one parts container, wherein the inventory information comprises a stored expected output.

5. The computer-implemented method of claim 4, wherein the inventory information further comprises route information for the at least one parts container.

6. The computer-implemented method of claim 4,
   wherein the output comprises a weight value determined using a weight sensor;
   wherein the stored expected output is a stored weight value listed in an inventory list; and
   wherein the inventory list is accessed by scanning a quick-response code or barcode on the at least one parts container.

7. The computer-implemented method of claim 4,
   wherein the output comprises a number of parts associated with the at least one parts container using a camera; and
   wherein the stored expected output is a stored number of parts values listed in an inventory list, wherein the inventory list is accessed by scanning a quick-response code or barcode on the at least one parts container.

8. The computer-implemented method of claim 1, wherein the output comprises at least one of: a weight value, a number of parts within the at least one parts container, or a number of packages within at least one parts container.

9. The computer-implemented method of claim 1, wherein the error is at least one missing part in the parts container; wherein the method further comprises locating the at least one missing part of the parts container using another sensor.

10. A method comprising:
- determining an output using a non-vision sensor at a parts receiving area, wherein the output is associated with a plurality of parts;
- comparing the output to a stored expected output;
- determining that the comparison exceeds a threshold, wherein the comparison exceeding the threshold indicates an error with parts receiving;
- determining, using a vision sensor, a cause of the error, in response to determining that the comparison exceeded the threshold;
- identifying a pattern related to the cause of the error; and
- outputting, to a display, a notification about the pattern.

11. The method of claim 10, wherein the notification comprises identifying a supplier as being the cause of the error.

12. The method of claim 10, further comprising:
storing the cause of the error in a database.

13. The method of claim 12, wherein identifying the pattern includes accessing stored, historical causes of errors, parts information, and supplier information in the database.

14. The method of claim 13, wherein outputting a notification about the pattern may include a graph.

15. The method of claim 10,
- wherein the output comprises a weight value determined using a weight sensor; wherein
- the stored expected output is a stored weight value listed in an inventory list;
- and
- wherein the inventory list is accessed by scanning a quick-response code or barcode on the at least one of the plurality of parts.

16. The method of claim 15,
- wherein the inventory list comprises a plurality of locations in the parts receiving area;
- and wherein the stored weight value is associated with a location of the plurality of locations.

17. The method of claim 10,
- wherein the output comprises a number of parts associated with the plurality of parts using a camera; and
- wherein the stored expected output is a stored number of parts values listed in an inventory list, wherein the inventory list is accessed by scanning a quick-response code or barcode on the at least one of the plurality of parts.

18. The method of claim 17, wherein determining the output further comprises:
determining a number of parts in an image produced by the camera using a vision system.

19. A system, comprising:
- a plurality of sensors disposed throughout a parts receiving area, wherein the plurality of sensors comprise at least two of the following: a camera, a thermal camera, light detection and ranging ("LIDAR") sensor, barcode scanner, or weight sensor;
and
- a non-transitory computer readable medium having stored thereon a plurality of instructions, wherein the instructions are executed with one or more processors so that the following steps are executed:
  - determining an output using a first sensor of the plurality of sensors at a first portion of the parts receiving area, wherein the output is associated with a plurality of parts;
  - comparing the output to a stored expected output, wherein the stored expected output is associated with the first portion of the parts receiving area;
  - determining that the comparison exceeds a threshold, wherein the comparison exceeding the threshold indicates at least one missing part of the plurality of parts such that an error exists with parts receiving;
  - determining, using a second sensor of the plurality of sensors at a second portion of the parts receiving area, a location of the at least one missing part, in response to determining that the comparison exceeded the threshold, wherein the second portion of the parts receiving area is different from the first portion of the parts receiving area;
  - determining a cause related to the at least one missing part; and
  - outputting, to a display, a notification about the cause of the at least one missing part.

20. The system of claim 19,
- wherein the parts receiving area comprises at least one of a docking area, a welding area, or a quality assurance area;
- wherein the first sensor of the plurality of sensors is a non-vision sensor; and
- wherein determining, using a second sensor of the plurality of sensors at a second portion of the parts receiving area, a cause of the missing parts occurs automatically in response to determining that the comparison exceeded the threshold.

* * * * *